United States Patent
Nishimura et al.

(10) Patent No.: US 9,812,718 B2
(45) Date of Patent: Nov. 7, 2017

(54) FUEL CELL SYSTEM

(75) Inventors: Hidetaka Nishimura, Yokosuka (JP); Yasushi Ichikawa, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 493 days.

(21) Appl. No.: 14/122,790

(22) PCT Filed: Apr. 17, 2012

(86) PCT No.: PCT/JP2012/060350
§ 371 (c)(1),
(2), (4) Date: Nov. 27, 2013

(87) PCT Pub. No.: WO2012/165073
PCT Pub. Date: Dec. 6, 2012

(65) Prior Publication Data
US 2014/0093803 A1 Apr. 3, 2014

(30) Foreign Application Priority Data

Jun. 2, 2011 (JP) ................................. 2011-124220

(51) Int. Cl.
| | |
|---|---|
| *H01M 8/04* | (2016.01) |
| *H01M 8/04089* | (2016.01) |
| *H01M 8/04828* | (2016.01) |
| *H01M 8/04119* | (2016.01) |
| *H01M 8/0432* | (2016.01) |
| *H01M 8/04492* | (2016.01) |

(Continued)

(52) U.S. Cl.
CPC ....... *H01M 8/04104* (2013.01); *H01M 8/045* (2013.01); *H01M 8/04089* (2013.01); *H01M 8/04164* (2013.01); *H01M 8/04179* (2013.01); *H01M 8/04343* (2013.01); *H01M 8/04753* (2013.01); *H01M 8/04761* (2013.01); *H01M 8/04843* (2013.01); *H01M 8/04358* (2013.01);

(Continued)

(58) Field of Classification Search
CPC ..... H01M 2008/1095; H01M 2250/20; H01M 8/04089; H01M 8/04179
USPC ........................................................ 429/446
See application file for complete search history.

(56) References Cited

U.S. PATENT DOCUMENTS

2003/0141188 A1* 7/2003 Imamura et al. ............. 204/424
2005/0142400 A1 6/2005 Turco et al.
(Continued)

FOREIGN PATENT DOCUMENTS

| JP | 7-226224 A | 8/1995 |
|---|---|---|
| JP | 2005-243477 A | 9/2005 |

(Continued)

OTHER PUBLICATIONS

Japanese Office Action, Aug. 12, 2014, 4 pages.

*Primary Examiner* — Jonathan Jelsma
*Assistant Examiner* — Rashid Alam
(74) *Attorney, Agent, or Firm* — Foley & Lardner LLP

(57) ABSTRACT

A fuel cell system that generates electric power by supplying anode gas and cathode gas to a fuel cell includes a control valve adapted to control the pressure of the anode gas to be supplied to the fuel cell; a buffer unit adapted to store the anode-off gas to be discharged from the fuel cell; a pulsation operation unit adapted to control the control valve in order to periodically increase and decrease the pressure of the anode gas at a specific width of the pulsation; and a pulsation width correcting unit adapted to correct the width of the pulsation on the basis of the temperature of the buffer unit.

11 Claims, 32 Drawing Sheets

(51) Int. Cl.
  *H01M 8/04746* (2016.01)
  *H01M 8/0438* (2016.01)
  *H01M 8/1018* (2016.01)

(52) U.S. Cl.
  CPC .............................. *H01M 8/04388* (2013.01);
                        *H01M 2008/1095* (2013.01);
                              *Y02E 60/50* (2013.01)

(56) References Cited

U.S. PATENT DOCUMENTS

2006/0204799 A1\* 9/2006 Ishikawa ............ B01D 53/0407
                                            48/197 FM
2011/0111314 A1\* 5/2011 Cui ........................... C01B 3/38
                                            429/417
2011/0274998 A1\* 11/2011 Ichikawa et al. ............. 429/446
2013/0164649 A1\* 6/2013 Nishimura ........ H01M 8/04089
                                            429/444

FOREIGN PATENT DOCUMENTS

| JP | 2007-517369 A | 6/2007 | |
|---|---|---|---|
| JP | 2009-123457 A | 6/2009 | |
| JP | 2008-97966 A | 6/2010 | |
| JP | 2010-129354 A | 6/2010 | |
| JP | 2010-277837 A | 12/2010 | |
| JP | 2011-28937 A | 2/2011 | |
| JP | WO 2012033003 A1 \* | 3/2012 | ........ H01M 8/04089 |
| WO | WO 2010058747 A1 \* | 5/2010 | |

\* cited by examiner

FUEL CELL SYSTEM

TECHNICAL FIELD

The present invention relates to a fuel cell system.

BACKGROUND ART

The fuel cell system described in JP2007-517369A includes a normally-closed solenoid-operated valve in an anode gas supply passage and a normally-opened solenoid-operated valve and a buffer tank (a recycle tank) in series from upstream in an anode gas discharge passage.

This conventional fuel cell system is an anode gas non-recycling fuel cell system which does not return unused anode gas discharged to the anode gas discharge passage to the anode gas supply passage, carrying out the pulsation operation to increase or decrease a pressure of the anode gas with a width of the pulsation in accordance with the operational status by means of a control valve for controlling the anode pressure.

SUMMARY OF INVENTION

However, the above-described conventional fuel cell system has not taken into account the temperature change of the buffer tank. Therefore, the conventional fuel cell system is problematic in that stability of electric power generation is lowered by a low level of the anode gas in the interior of a fuel cell stack or a discharge performance of liquid water is deteriorated depending on the temperature of the buffer tank when the pulsation operation is carried out at the set width of the pulsation.

The present invention has been created in the light of the above-described problems, with the object of carrying out stable electric power generation and ensuring the discharge performance of liquid water by setting an appropriate width of the pulsation in accordance with the temperature of the buffer tank.

In order to attain the above-described object, a specific aspect of the present invention provides a fuel cell system comprising: a control valve adapted to control the pressure of the anode gas to be supplied to the fuel cell; a buffer unit adapted to store the anode-off gas to be discharged from the fuel cell; a pulsation operation means adapted to control the control valve in order to periodically increase and decrease the pressure of the anode gas at a specific width of the pulsation; and a pulsation width correcting means adapted to correct the width of the pulsation on the basis of the temperature of the buffer unit.

The embodiments and advantages of the present invention will be hereinafter described in detail with reference to the attached drawings.

DESCRIPTION OF EMBODIMENTS

First Embodiment

A fuel cell formed by interposing an electrolyte membrane between an anode (a fuel electrode) and a cathode (an oxidizing agent electrode) generates electric power by supplying anode gas (fuel gas) containing hydrogen to the anode and cathode gas (oxidizing agent gas) containing oxygen to the cathode. Electrode reaction progressing in both electrodes, namely, the anode and the cathode is as follows:

Anode: $2H_2 \rightarrow 4H^+ + 4e^-$ (1)

Cathode: $4H^+ + 4e^- + O_2 \rightarrow 2H_2O$ (2)

These electric reactions (1) and (2) allow the fuel cell to generate an electromotive force of about one volt.

Figure 1A:
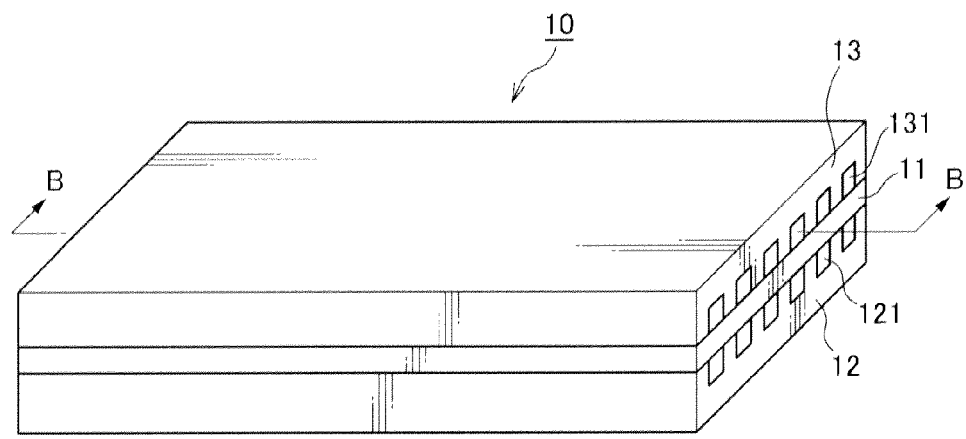
FIG. 1A is a schematic perspective view of a fuel cell.
Figure 1B:
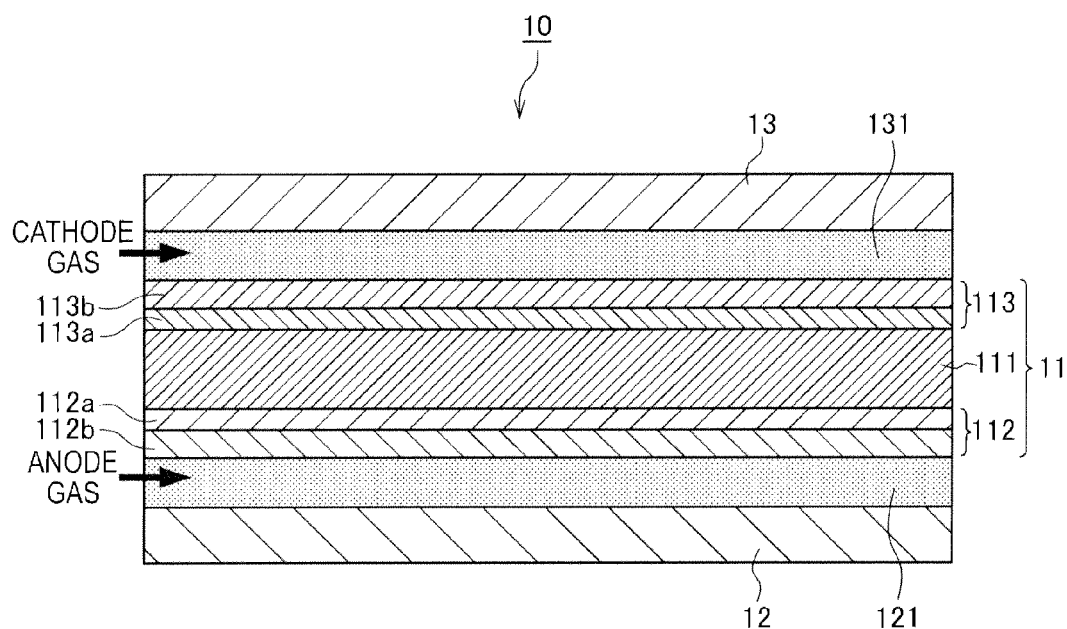
FIG. 1B is a sectional view of the fuel cell.

FIG. 1A is a schematic perspective view of a fuel cell 10. FIG. 1B is a B-B sectional view of the fuel cell 10 of FIG. 1A.

The fuel cell 10 is configured by arranging an anode separator 12 and a cathode separator 13 on both sides of a membrane electrode assembly (hereinafter, referred to as "MEA") 11.

The MEA 11 is provided with an electrolyte membrane 111, an anode 112, and a cathode 113. The MEA 11 has the anode 112 on one side of the electrolyte membrane 111 and the cathode 113 on the other side thereof.

The electrolyte membrane 111 is a proton-conducting ion-exchange membrane made by a fluorinated resin. The electrolyte membrane 111 shows an excellent electric conductivity in a wet condition.

The anode 112 is provided with a catalyst layer 112a and a gas diffusion layer 112b. The catalyst layer 112a comes in contact with the electrolyte membrane 111. The catalyst layer 112a is made of platinum-supported carbon black particles or platinum, etc.-supported carbon black particles. The gas diffusion layer 112b is located outside of the catalyst layer 112a (the other side of the electrolyte 111), coming in contact with the anode separator 12. The gas diffusion layer 112b is formed by a member having a sufficient gas diffuseness and a conductive property, for example, a carbon cloth woven by yearns made of a carbon fiber.

The cathode 113 is also provided with a catalyst layer 113a and a gas diffusion layer 113b along with the anode 112.

The anode separator 12 comes in contact with the gas diffusion layer 112b. The anode separator 12 has a plurality of groove-like anode gas flow passages 121 for supplying anode gas to the anode 112 on the side coming in contact with the gas diffusion layer 112b.

The cathode separator 13 comes in contact with the gas diffusion layer 113b. The cathode separator 13 has a plurality of groove-like cathode gas flow passages 131 for supplying cathode gas to the cathode 113 on the side coming in contact with the gas diffusion layer 113b.

The anode gas flowing through the anode gas flow passages 121 and the cathode gas flowing through the cathode gas flow passages 131 flow in parallel to each other in the same direction. They may flow in parallel to each other in the reverse direction.

In the case of using such a fuel cell 10 as an automotive power source, a fuel cell stack with hundreds of fuel cells 10 piled up is used since large electric power is required. Then, electric power for driving a vehicle is taken by configuring a fuel cell system for supplying anode gas and cathode gas to the fuel cell stack.

Figure 2:
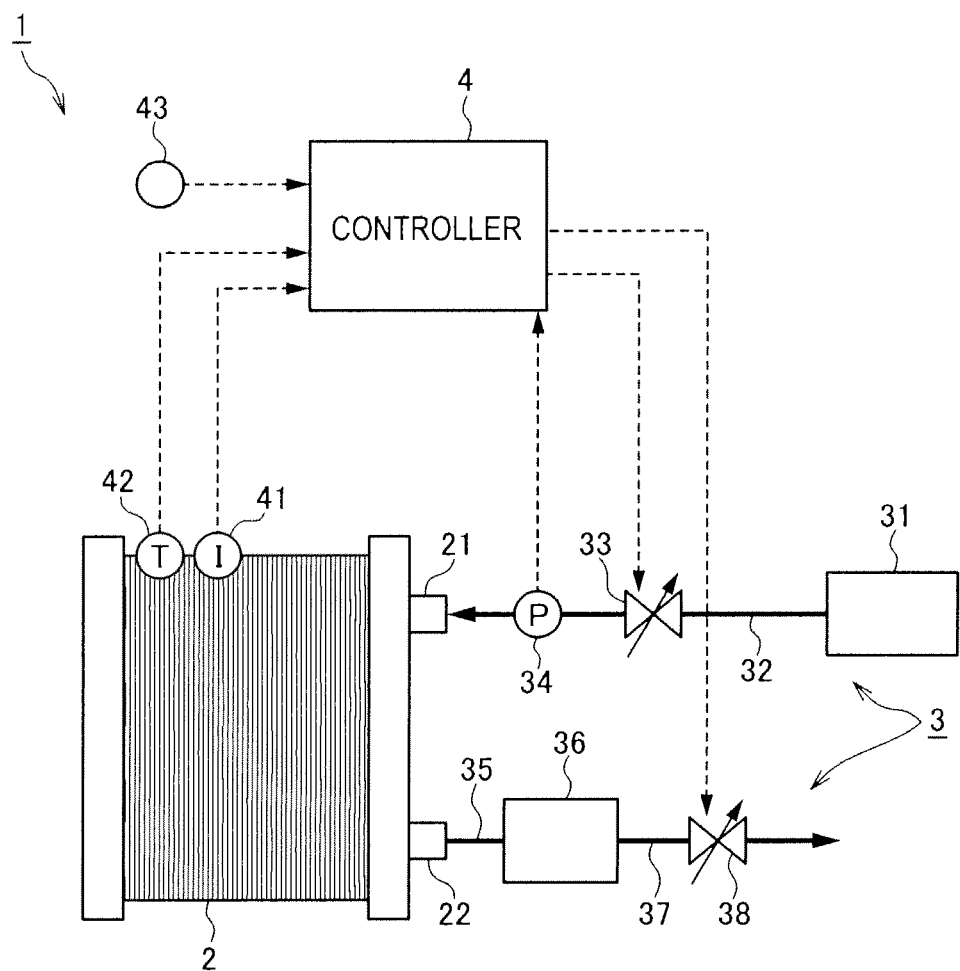
FIG. 2 is a schematic block diagram of an anode gas non-recycling fuel cell system according to a first embodiment of the present invention.

FIG. 2 is a schematic block diagram of an anode gas non-recycling fuel cell system 1 according to the embodiment of the present invention.

The fuel cell system 1 is provided with a fuel cell stack 2, an anode gas supplier 3, and a controller 4.

The fuel cell stack 2 formed by piling up a plurality of fuel cells 10 generates electric power by being supplied with anode gas and cathode gas, generating electric power required for driving a vehicle (for example, electric power required for driving a motor).

Illustrations of a cathode gas supplier and discharger for supplying and discharging cathode gas to the fuel cell stack 2 and a cooling system for cooling the fuel cell stack 2 are omitted in order to facilitate understanding of the present invention since they are not main parts of the present invention. The present embodiment uses air as cathode gas.

The anode gas supplier 3 is provided with a high pressure tank 31, an anode gas supply passage 32, a pressure-adjusting valve 33, a pressure sensor 34, an anode gas discharge passage 35, a buffer tank 36, a purge passage 37, and a purge valve 38.

The high pressure tank 31 stores the anode gas to be supplied to the fuel cell stack 2 while keeping it at a high pressure.

The anode gas supply passage 32 is a passage for supplying the anode gas discharged from the high pressure tank 31 to the fuel cell stack 2, wherein one end of which is connected to the high pressure tank 31 and the other end of which is connected to an anode gas inlet hole 21 of the fuel cell stack 2.

The pressure-adjusting valve 33 is located in the anode gas supply passage 32. The pressure-adjusting valve 33 adjusts the anode gas discharged from the high pressure tank 31 to the desired pressure, then, supplies it to the fuel cell stack 2. The pressure-adjusting valve 33 is an electromagnetic valve capable of continuously or step-by-step adjusting the aperture that is controlled by the controller 4.

The pressure sensor 34 is located in the anode gas supply passage 32 located downstream of the pressure-adjusting valve 33. The pressure sensor 34 detects the pressure of the anode gas flowing through the anode gas supply passage 32 located downstream of the pressure-adjusting valve 33. According to the present embodiment, the pressure of the anode gas detected by this pressure sensor 34 is used as the pressure of the entire anode system including respective anode gas flow passages 121 in the interior of the fuel cell stack and the buffer tank 36 (hereinafter, referred to as "an anode pressure").

The anode gas discharge passage 35 has the end connected to an anode gas outlet hole 22 of the fuel cell stack 2 and the other end connected to the top of the buffer tank 36. The mixture gas of the redundant anode gas that has not been used for electrode reactions and the impure gas such as nitrogen and moisture that has transmitted from the cathode to the anode gas flow passage 121 (hereinafter, referred to as "anode-off gas") is discharged to the anode gas discharge passage 35.

The buffer tank 36 once stores the anode-off gas that has flown through the anode gas discharge passage 35. Moisture in the anode-off gas partially becomes liquid water by being condensed in the buffer tank 36, being separated from the anode-off gas.

The purge passage 37 has the end connected to the bottom of the buffer tank 36. The other end of the purge passage 37 is an opening end. The anode-off gas and liquid water stored in the buffer tank 36 are discharged from the opening end to external air through the purge passage 37. They are normally discharged to a cathode discharge line although not illustrated in FIG. 2.

The purge valve 38 is located in the purge passage 37. The purge valve 38 is an electromagnetic valve capable of continuously or step-by-step adjusting the aperture that is controlled by the controller 4. The amount of anode-off gas to be discharged from the buffer tank 36 to external air via the purge passage 37 is adjusted through adjustment of the aperture of the purge valve 38, further, the anode gas level in the buffer tank 36 is adjusted such that it becomes a constant level. If the operational status of the fuel cell system 1 is identical, the more the aperture of the purge valve 38 is increased, the more the nitrogen level in the buffer tank 36 is decreased and the more the anode gas level is increased.

The controller 4 is configured by a microcontroller including a central processing unit (CPU), a random access memory (RAM), and an input/output interface (I/O interface).

The controller 4 receives signals for detecting the operational status of the fuel cell system 1 from a sensor, other than the above-descried pressure sensor 34, such as an electric current sensor 41 for detecting the output current of the fuel cell stack 2, a temperature sensor 42 for detecting a temperature of cooling water that cools the fuel cell stack 2 (hereinafter, referred to as "a stack temperature"), and an accelerator stroke sensor 43 for detecting the depression amount of the accelerator pedal (hereinafter, referred to as "accelerator operational amount").

The controller 4 carries out the pulsation operation for periodically increasing and decreasing the anode pressure by periodically opening and closing the pressure-adjusting valve 33 on the basis of these input signals and maintains the anode gas level in the buffer tank 36 at a specific level by adjusting the flowing amount of the anode gas to be discharged from the buffer tank 36 through adjustment of the purge valve 38.

In the case of the anode gas non-recycling fuel cell system 1, if the fuel cell system 1 continuously supplies the anode gas from the high pressure tank 31 to the fuel cell stack 2 while leaving the pressure-adjusting valve 33 open, the anode-off gas containing the unused anode gas discharged from the fuel cell stack 2 wastefully continues to be discharged from the buffer tank 36 to external air via the purge passage 37.

Therefore, according to the present embodiment, the pulsation operation for periodically increasing and decreasing the anode pressure is carried out by periodically opening and closing the pressure-adjusting valve 33. It is possible to allow the anode-off gas stored in the buffer tank 36 to flow backward to the fuel cell stack 2 upon reduction of the anode pressure by carrying out the pulsation operation. Thereby, it is possible to decrease the anode gas amount to be discharged to external air since the anode gas in the anode-off gas can be reused, and as a result, it can be more efficient.

Hereinafter, the pulsation operation, as well as the reason why the anode-off gas stored in the buffer tank 36 flows backward to the fuel cell stack 2 upon reduction of the anode pressure, will be explained with reference to FIG. 3.

Figure 3:
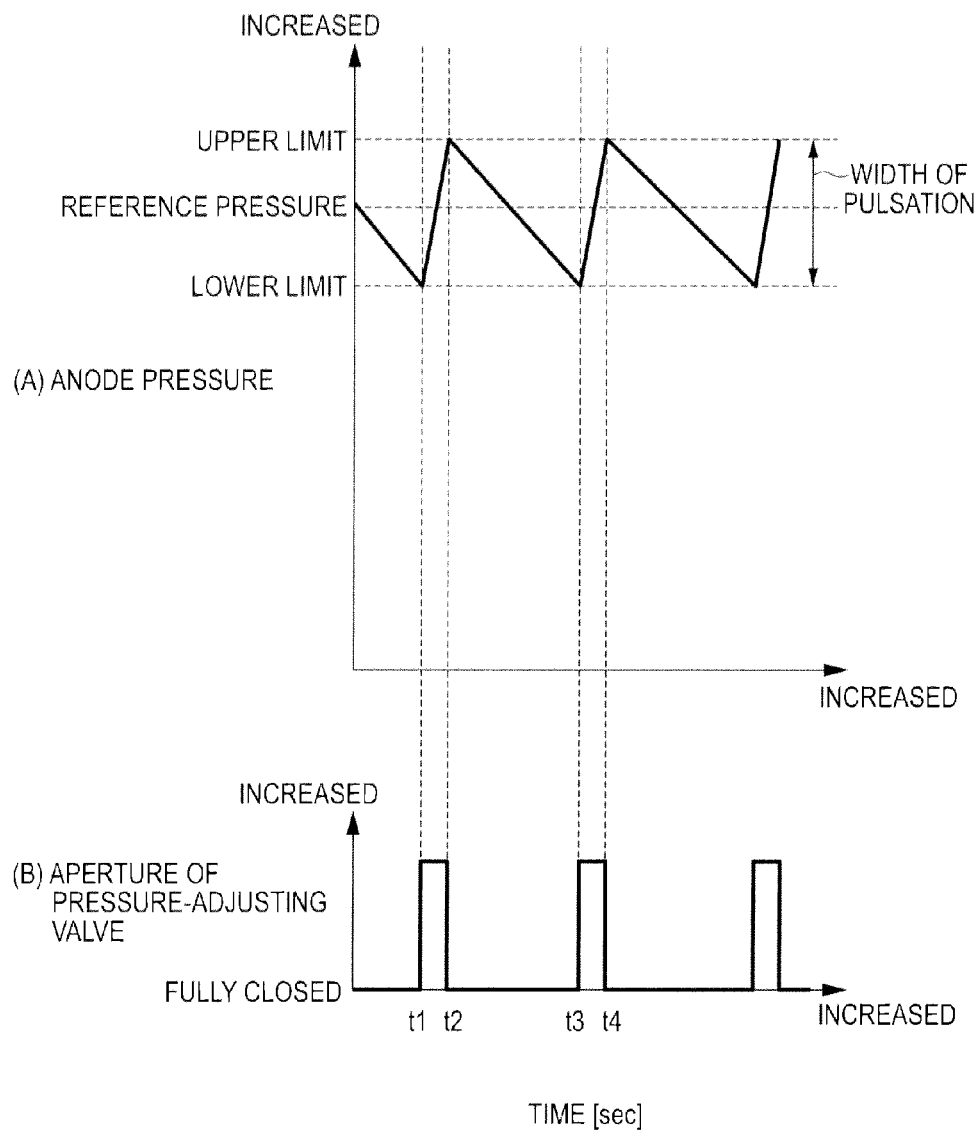
FIG. 3 is a view explaining the pulsation operation at a steady operation.

FIG. 3 is a view explaining the pulsation operation when the operation status of the fuel cell system 1 is a steady operation.

As illustrated in FIG. 3(A), the controller 4 computes the reference pressure and the width of the pulsation of the anode pressure on the basis of the load applied to the fuel cell stack 2 (hereinafter, referred to as "a stack load") (output current), setting the upper limit and the lower limit of the anode pressure. Then, the anode pressure is periodically increased and decreased between the upper limit and the lower limit of the set anode pressure by periodically increasing and decreasing the anode pressure within the range of the width of the pulsation on the basis of the reference pressure.

Specifically, when the anode pressure reaches the lower limit at a time t1, as illustrated in FIG. 3(B), the pressure-adjusting valve 33 is opened to at least the aperture at which the anode pressure can be increased to the upper limit. In this state, the anode gas is discharged to the buffer tank 36 after being supplied from the high pressure tank 31 to the fuel cell stack 2.

If the anode pressure reaches the upper limit at a time t2, as illustrated in FIG. 3(B), the pressure-adjusting valve 33 is fully opened, stopping supply of anode gas from the high pressure tank 31 to the fuel cell stack 2. Then, since the anode gas left in the anode gas flow passage 121 in the interior of the fuel cell stack is consumed as time advances in accordance with the above-described electrode reaction (1), the anode pressure is reduced for the consumed amount of the anode gas.

In addition, if the anode gas left in the anode gas flow passage 121 is consumed, the anode-off gas flows backward from the buffer tank 36 to the anode gas flow passage 121 since the pressure of the buffer tank 36 becomes temporarily higher than the pressure of the anode gas flow passage 121. As a result, the anode gas left in the anode gas flow passage 121 and the anode gas in the anode-off gas flowed backward to the anode gas flow passage 121 are consumed as time advances and the anode pressure is further lowered.

When the anode pressure reaches the lower limit at a time t3, the pressure-adjusting valve 33 is opened along with the case at the time t1. Then, if the anode pressure reaches the upper limit again at a time t4, the pressure-adjusting valve 33 is fully closed.

Here, the above-described reference pressure and width of the pulsation of the anode pressure are set on the basis of the premise that the temperature of the fuel cell stack 2 is identical to the temperature of the buffer tank 36. Specifically, they are set on the basis of the premise that the temperature of the buffer tank 36 is identical to the steady temperature of the fuel cell stack 2 when warming up of the fuel cell stack 2 is completed (about 60 C.°).

However, the temperature of the buffer tank 36 is sometimes lower than the steady temperature of the fuel cell stack 2 during warming up of the fuel cell stack 2. In addition, the temperature of the buffer tank 36 is sometimes lower or higher than the steady temperature of the fuel cell stack 2 since it is varied even after completion of worming up of the fuel cell stack 2 in accordance with the external environments such as an ambient temperature and an air resistance.

It has been found that the following respective problems are caused upon reduction of the anode pressure from the upper limit pressure to the lower limit pressure and upon increase of the anode pressure from the lower limit pressure to the upper limit pressure if the width of the pulsation is set without taking into account such change in temperature of the buffer tank 36 in the case of carrying out the pulsation operation.

First, the problem caused upon reduction of the anode pressure will be described.

The amount of material in the anode gas (hydrogen) located in the interior of the buffer tank 36 when the anode pressure reaches a specific upper limit pressure is varied in accordance with the temperature of the buffer tank 36. Specifically, if the pressure in the interior of the buffer tank 36 is the same, the lower the temperature of the buffer tank 36 becomes, the more the amount of material in the anode gas located in the interior of the buffer tank 36 is increased.

The anode pressure is reduced from the upper limit pressure to the lower limit pressure upon reduction of the anode pressure by consuming the anode gas left in the anode gas flow passage 121 and the anode gas in the interior of the anode-off gas flowed backward to the anode gas flow passage 121. Therefore, the time required for lowering the anode pressure to the lower limit becomes long since the more the amount of material in the anode gas located in the interior of the buffer tank 36 is increased, the more the consumed amount of the anode gas needed for lowering the anode pressure to the lower limit is increased.

Here, a part of which anode gas level is lower than the levels of other parts is locally generated within the anode gas flow passage 121 upon reduction of the anode pressure. The reason for this will be described with reference to FIG. 4.

Figure 4:
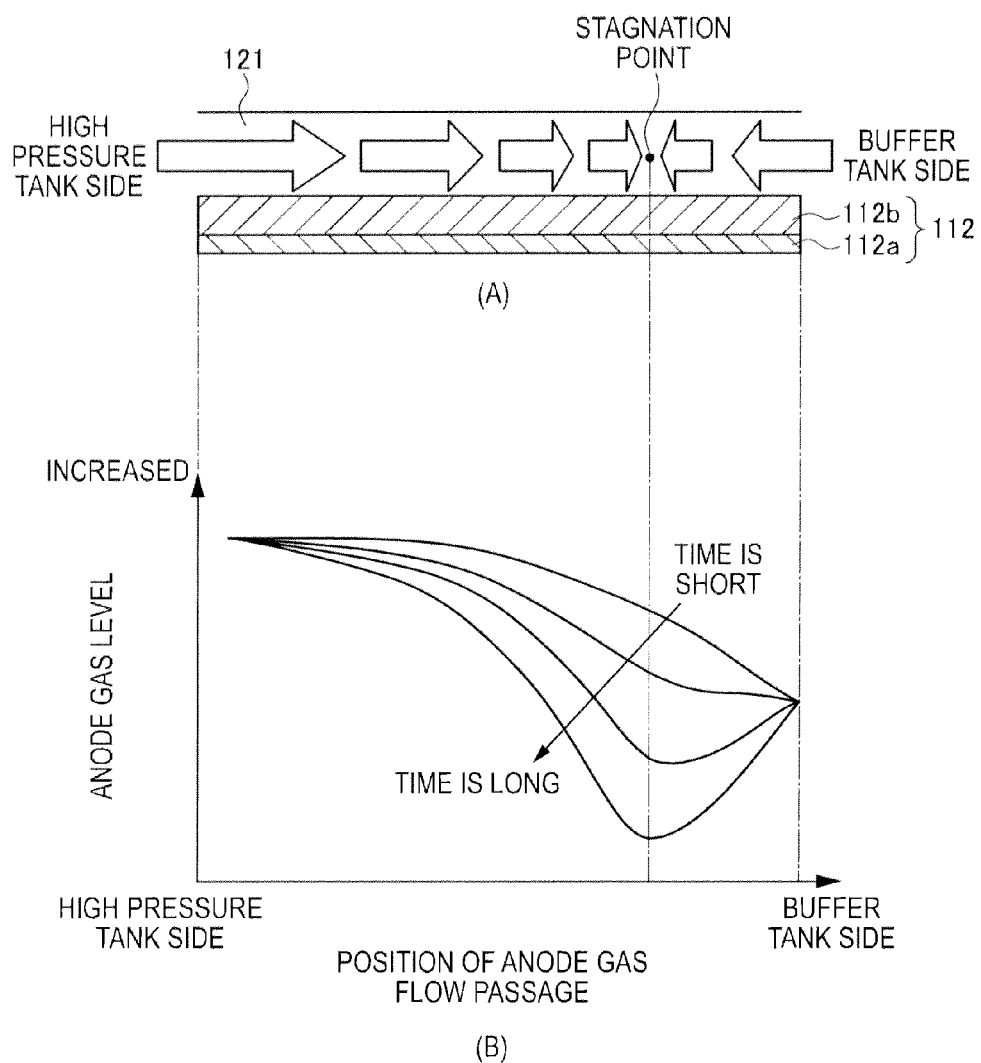
FIG. 4 is a view explaining a reason why a part of which anode gas level is lower than those of other parts is locally generated in the interior of an anode gas flow passage.

FIG. 4 is a view explaining a reason why a part of which anode gas level is lower than those of other parts is locally generated within the anode gas flow passage 121. FIG. 4(A) is a view illustrating flows of the anode gas and the anode-off gas in the interior of the anode gas flow passage 121 upon reduction of the anode pressure. FIG. 4(B) is a view illustrating the level distribution of the anode gas in the interior of the anode gas flow passage 121 upon reduction of the anode pressure as time advances.

As illustrated in FIG. 4(A), the anode-off gas flows backward from the buffer tank 36 side to the anode gas flow passage 121 since the pressure of the buffer tank 36 is temporarily higher than that of the anode gas flow passage 121 if the anode gas left in the anode gas flow passage 121 is consumed. In addition, the high level of anode gas located in the anode gas supply passage 32 similarly flows into the anode gas flow passage 121 of which pressure is low.

Then, a stagnation point where each gas flow rate becomes substantially zero is generated at the injunction point of the anode gas flowing from the anode gas supply passage 32 side into the anode gas flow passage 121 and the anode-off gas that has flown backward from the buffer tank 36 side to the anode gas flow passage 121.

If such a stagnation point is generated within the anode gas flow passage 121, nitrogen in the interior of the anode-off gas that is not used for the above-described electrode reactions (1) is stored in the vicinity of the stagnation point as time advances. As a result, the nitrogen level in the vicinity of the stagnation point is higher than the levels of other parts, and the anode gas level in the vicinity of the stagnation point is decreased less than the levels of other parts as time advances as illustrated in FIG. 4(B).

If the anode gas level in the part where the anode gas level is lowest within the anode gas flow passage 121 (hereinafter, referred to as "the lowest anode gas level in the flow passage") is lower than the predetermined allowable lower limit anode gas level, the voltage is possibly turned into a negative voltage since the above-described electrode reactions (1) and (2) are prevented and this causes the deterioration of the fuel cell 10.

Accordingly, it has to avoid the lowest anode gas level in the flow passage from falling below the allowable lower limit anode gas level upon reduction of the anode pressure.

However, if the pulsation operation is carried out at the width of the pulsation that is set on the basis of the premise that the temperature of the buffer tank 36 is the steady temperature of the fuel cell stack 2 when the temperature of the buffer tank 36 is lower than the steady temperature of the fuel cell stack 2, the time required for lowering the anode pressure to the lower limit pressure becomes long, possibly causing the lowest anode gas level in the flow passage to fall below the allowable lower limit anode gas level.

Therefore, according to the present embodiment, when the temperature of the buffer tank 36 is low, the time required for lowering the anode pressure to the lower limit pressure is shortened by correcting the width of the pulsation to be small. Thereby, the lowest anode gas level in the flow passage is prevented from falling below the allowable lower limit anode gas level.

Figure 5:
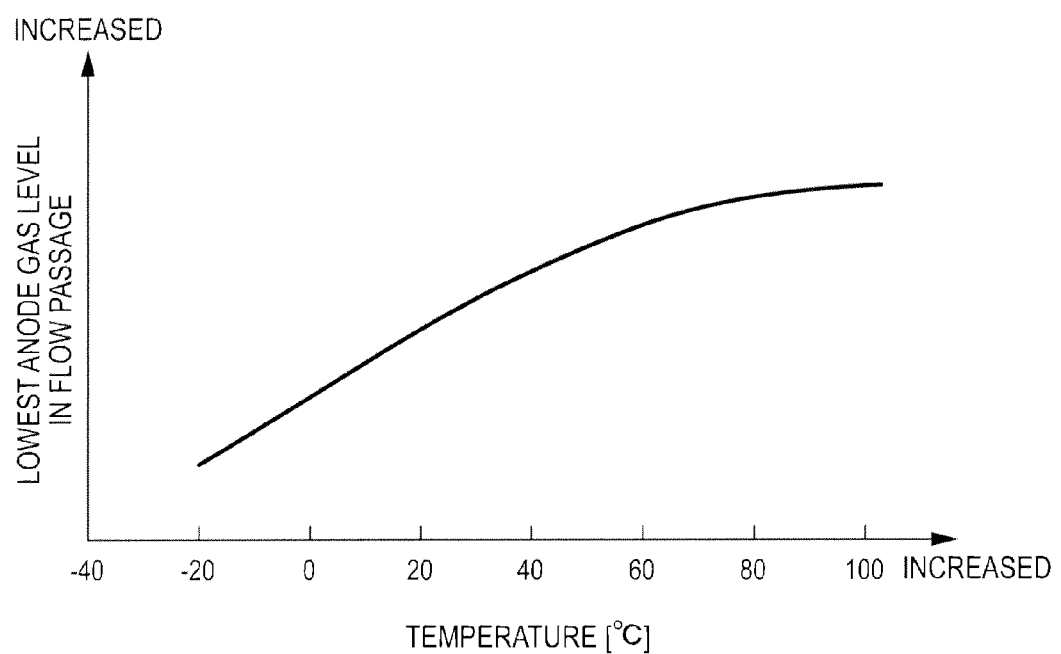
FIG. 5 is a view illustrating the lowest anode gas level in the flow passage at the same width of the pulsation upon reduction of an anode pressure in accordance with the temperature of a buffer tank.

FIG. 5 is a view illustrating the lowest anode gas level in the flow passage at the same width of the pulsation upon reduction of the anode pressure in accordance with the temperature of the buffer tank 36.

As illustrated in FIG. 5, if the width of the pulsation is the same, it has been found that the lower the temperature of the buffer tank 36 becomes, the longer the time required for lowering the anode pressure to the lower limit pressure becomes, and the lowest anode gas level in the flow passage is lowered.

Subsequently, the problem caused upon increase of the anode pressure will be described.

As described above, the amount of material in the anode gas (hydrogen) located in the interior of the buffer tank 36 when the anode pressure reaches a specific upper limit pressure is varied in accordance with the temperature of the buffer tank 36. Specifically, if the pressure in the interior of the buffer tank 36 is the same, the higher the temperature of the buffer tank 36 becomes, the more the amount of material in the anode gas located in the interior of the buffer tank 36 is decreased.

Therefore, the higher the temperature of the buffer tank 36 becomes, the more the amount of the anode gas required to increase the anode gas to the upper limit pressure is reduced. As a result, the higher the temperature of the buffer tank 36 becomes, the more the flow rate of the anode gas upon increase of the anode pressure and therefore the kinetic energy are reduced, then the discharge performance of liquid water in the interior of the anode gas flow passage 121 is deteriorated.

Accordingly, if the pulsation operation is carried out at the width of the pulsation that is set on the basis of the premise that the temperature of the buffer tank 36 is identical to the steady temperature of the fuel cell stack 2 when the temperature of the buffer tank 36 is higher than the steady temperature of the fuel cell stack 2, the kinetic energy of the anode gas possibly falls below the minimum value of the kinetic energy required for discharging liquid water in the interior of the anode gas flow passage 121 (hereinafter, referred to as "the allowable lower limit kinetic energy").

Therefore, according to the present embodiment, the kinetic energy of the anode gas is ensured by adjusting the width of the pulsation to be large when the temperature of the buffer tank 36 is high.

Figure 6:
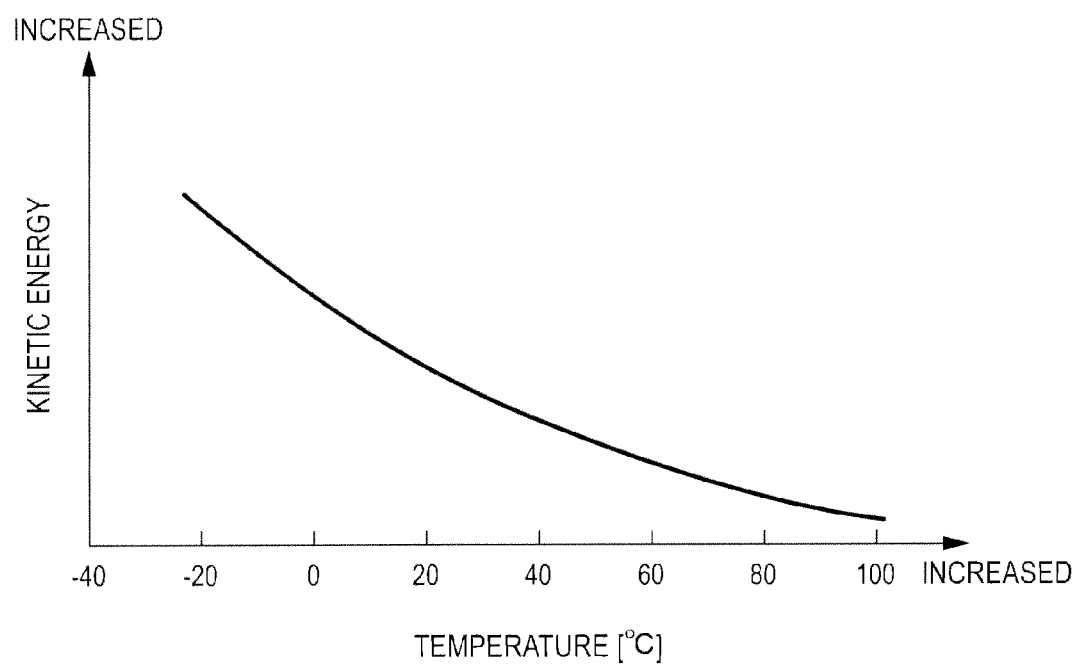
FIG. 6 is a view illustrating the intensity of kinetic energy of the anode gas at the same width of the pulsation upon increase of an anode pressure in accordance with the temperature of a buffer tank.

FIG. 6 is a view illustrating the intensity of kinetic energy of the anode gas at the same width of the pulsation upon increase of the anode pressure in accordance with the temperature of the buffer tank 36.

As illustrated in FIG. 6, it is found that the higher the temperature of the buffer tank 36 becomes, the lower the kinetic energy of the anode gas becomes at the same width of the pulsation.

The control of the pulsation operation according to the present embodiment will be hereinafter described.

Figure 7:
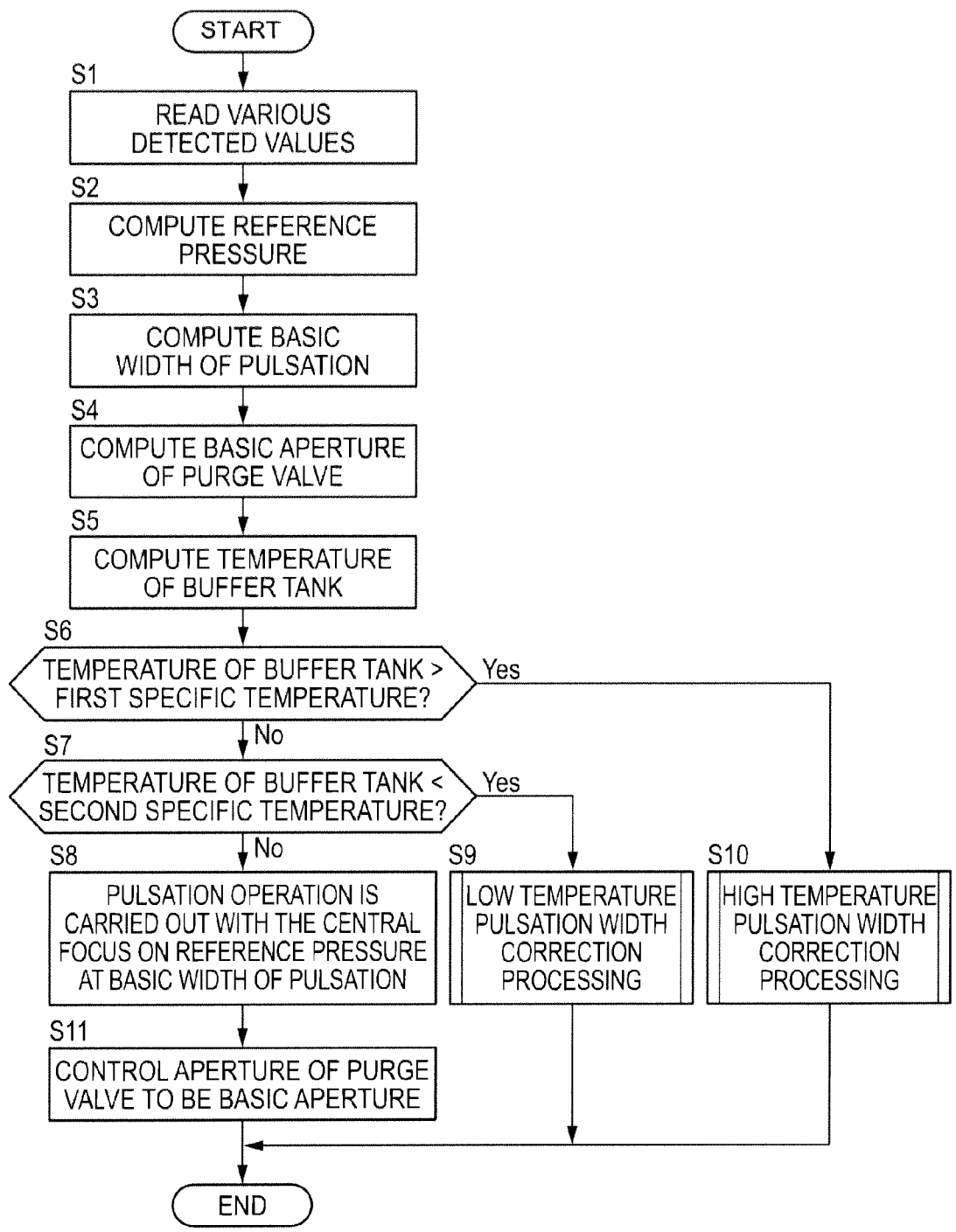
FIG. 7 is a flowchart explaining the control of the pulsation operation according to the first embodiment of the present invention.

FIG. 7 is a flowchart explaining the control of the pulsation operation according to the present embodiment of the present invention. The controller 4 repeatedly carries out the present routine for each specific time (for example, 10 ms).

The controller 4 reads the output current, a stack temperature, an ambient temperature, and a vehicle speed as a stack load in Step S1.

Figure 8:
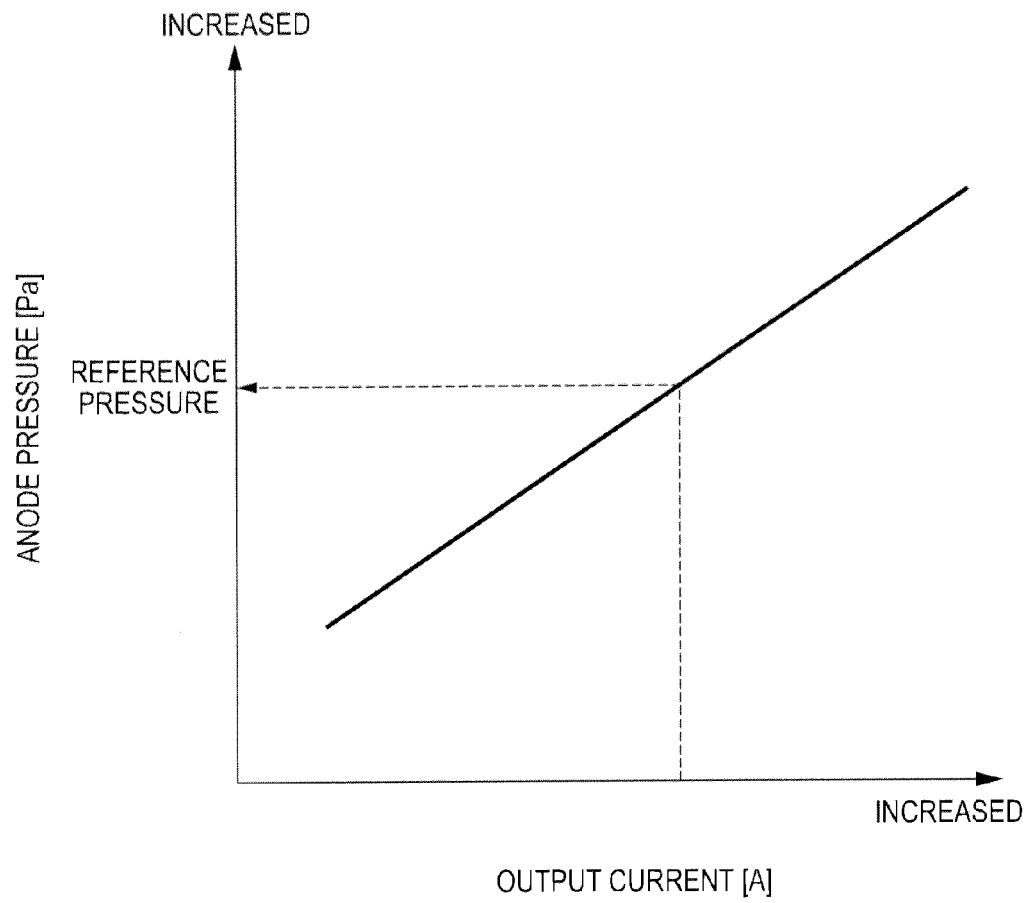
FIG. 8 is a table for computing a reference pressure from the output electric current.

The controller 4 computes the reference pressure of the anode pressure in the pulsation operation on the basis of the output current with reference to the table illustrated in FIG. 8 in Step S2. As illustrated in FIG. 8, the larger the output current is, the more the reference pressure of the anode pressure is increased.

Figure 9:
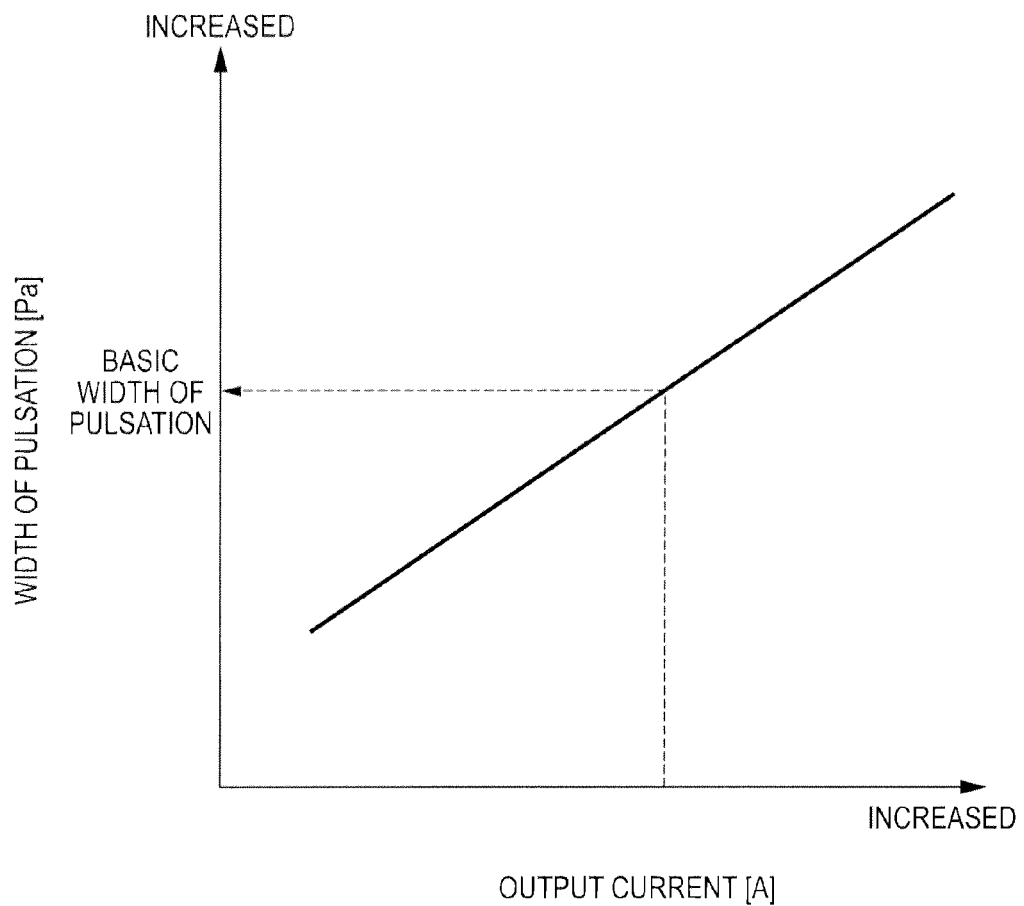
FIG. 9 is a table for computing a basic width of the pulsation from the output electric current.

The controller 4 computes the basic value of the width of the pulsation (hereinafter, referred to as "a basic width of the pulsation") in the pulsation operation on the basis of the output current with reference to the table illustrated in FIG. 9 in Step S3. As illustrated in FIG. 9, the larger the output current is, the more the basic width of the pulsation is increased.

Figure 10:
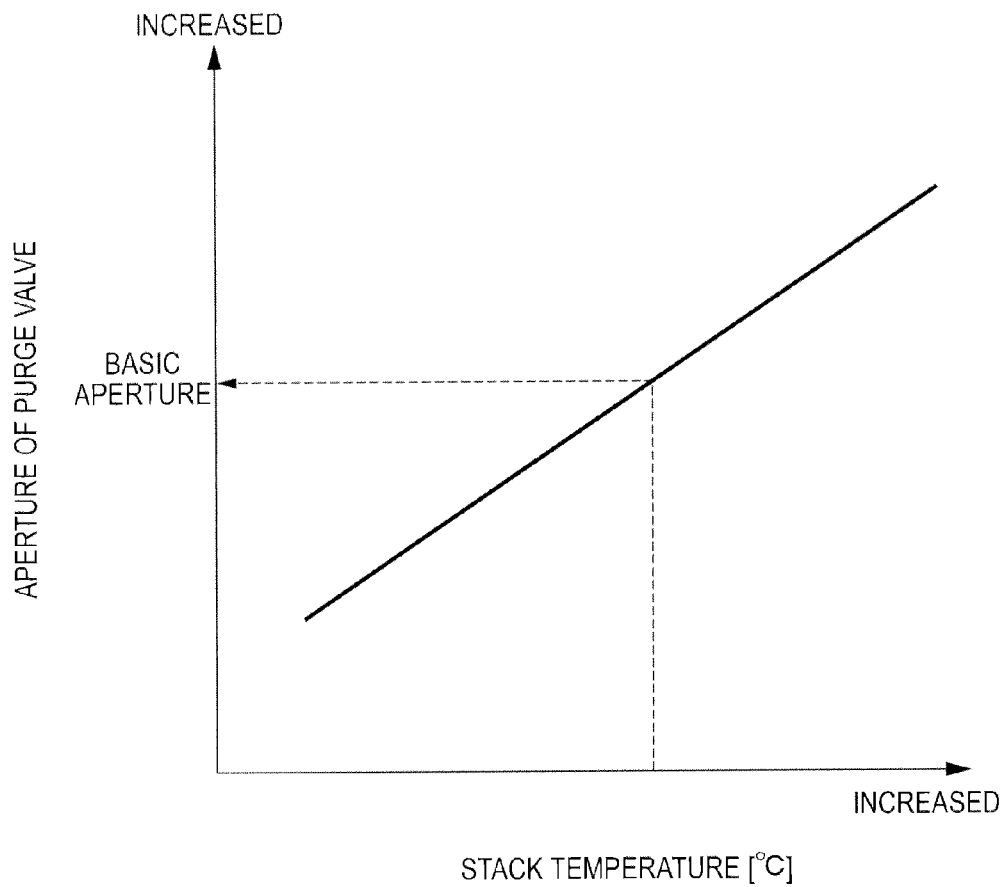
FIG. 10 is a table for computing a basic aperture of a purge valve from the temperature of a fuel cell stack.

The controller 4 computes the basic aperture of the purge valve on the basis of the stack temperature with reference to the table illustrated in FIG. 10 in Step S4. As illustrated in FIG. 10, the higher the stack temperature is, the more the basic aperture of the purge valve is increased.

The controller 4 computes the temperature of the buffer tank 36 in Step S5. According to the present embodiment, the controller 4 computes the temperature of the buffer tank 36 on the basis of a stack temperature, an ambient temperature, and a vehicle speed.

The controller 4 determines whether or not the temperature of the buffer tank 36 is higher than a first specific temperature in step S6. The first specific temperature is set at a temperature higher than the steady temperature of the fuel cell stack 2 when the warming up thereof is completed (about 60° C.). The controller 4 carries out the processing of Step S10 if the temperature of the buffer tank 36 is higher than the first specific temperature and carries out the processing of Step S7 if it is lower than the first specific temperature.

The controller 4 determines whether or not the temperature of the buffer tank 36 is lower than a second specific temperature in step S7. The second specific temperature is set at a temperature lower than the steady temperature of the fuel cell stack 2 when the warming up thereof is completed. The controller 4 carries out the processing of Step S9 if the temperature of the buffer tank 36 is lower than the second specific temperature and carries out the processing of Step S8 if it is higher than the second specific temperature.

The controller 4 carries out the pulsation operation by periodically increasing and decreasing the anode pressure with the central focus on the reference pressure within the range of the basic width of the pulsation in Step S8 after determining that the temperature of the buffer tank 36 is substantially identical to the steady temperature of the fuel cell stack 2.

The controller 4 determines that the temperature of the buffer tank 36 is lower than the steady temperature of the fuel cell stack 2 in Step S9, carrying out the low temperature pulsation width correction processing in order to make the width of the pulsation smaller than the basic width of the pulsation. The low temperature pulsation width correction processing will be later described with reference to FIG. 11.

The controller 4 carries out the high temperature pulsation width correction processing in order to make the width of the pulsation larger than the basic width of the pulsation in Step S10 after determining that the temperature of the buffer tank 36 is lower than the steady temperature of the fuel cell stack 2. The high temperature pulsation width correction processing will be later described with reference to FIG. 13.

The controller 4 controls the aperture of the purge valve to be a basic aperture in Step S11.

Figure 11:
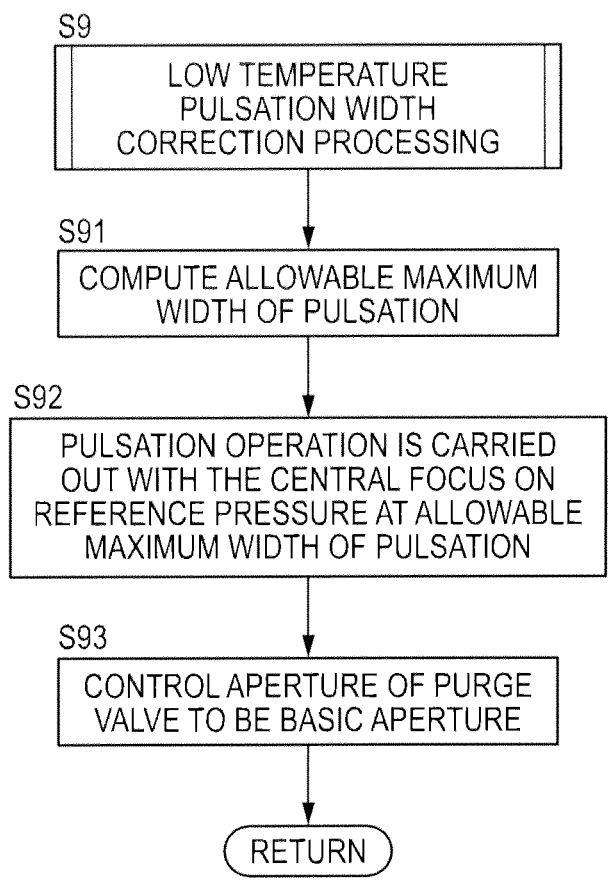
FIG. 11 is a flowchart explaining the low temperature pulsation width correction processing according to the first embodiment of the present invention.

FIG. 11 is a flowchart explaining the low temperature pulsation width correction processing.

The controller 4 computes the maximum value of the width of the pulsation at which the lowest anode gas level in the flow passage does not fall below the allowable lower limit anode gas level (hereinafter, referred to as "the allowable maximum width of the pulsation") on the basis of the temperature of the buffer tank 36 with reference to the map illustrated in FIG. 12 in Step S91.

Figure 12:
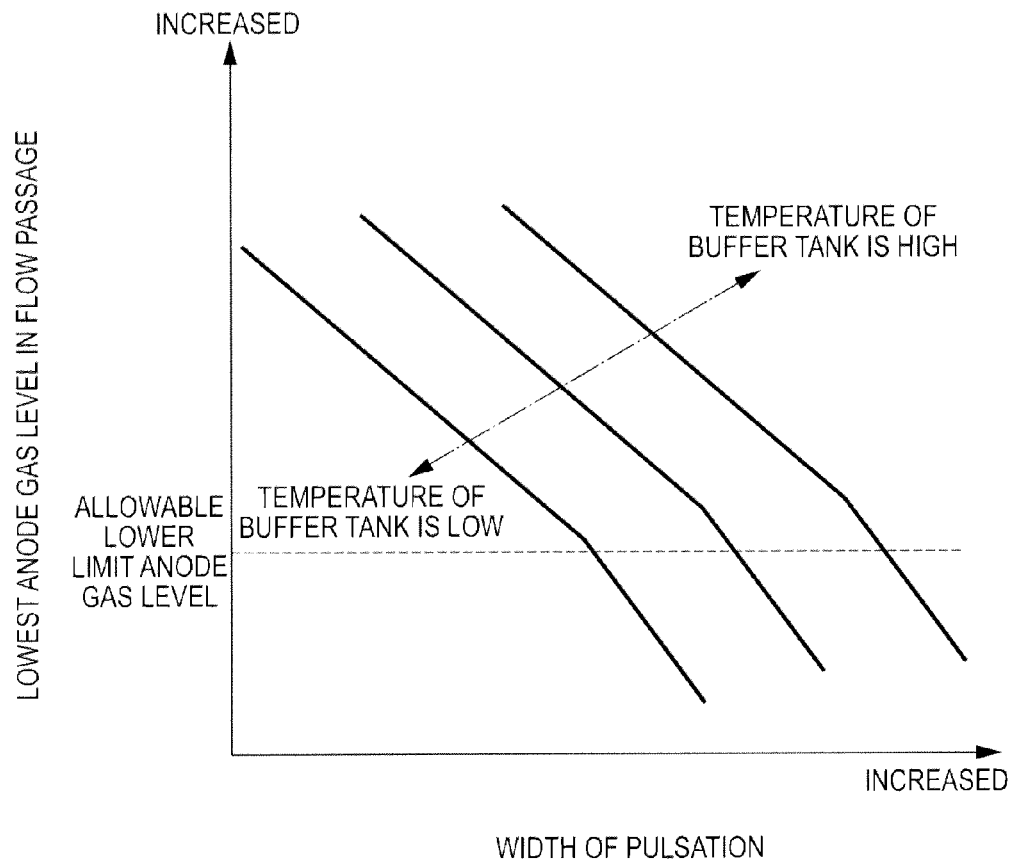
FIG. 12 is a map representing a relation between the width of the pulsation and the lowest anode gas level in the flow passage upon reduction of the anode pressure for each temperature of the buffer tank.

FIG. 12 is a map representing a relation between the width of the pulsation and the lowest anode gas level in the flow passage upon reduction of the anode pressure for each temperature of the buffer tank 36.

As illustrated in FIG. 12, if the temperature of the buffer tank 36 is the same, the lowest anode gas level in the flow passage becomes high since the smaller the width of the pulsation is, the shorter the time required for lowering the anode pressure to the lower limit pressure becomes. In addition, if the width of the pulsation is the same, the lowest anode gas level in the flow passage becomes low since the lower the temperature of the buffer tank 36 is, the more the amount of material in the anode gas located in the interior of the buffer tank 36 is increased and the longer the time required for lowering the anode pressure to the lower limit pressure becomes.

The controller 4 carries out the pulsation operation by periodically increasing and decreasing the anode pressure within the range of the allowable minimum width of the pulsation with the central focus on the reference pressure in Step S92.

The controller 4 controls the aperture of the purge valve to be the basic aperture in Step S93.

Figure 13:
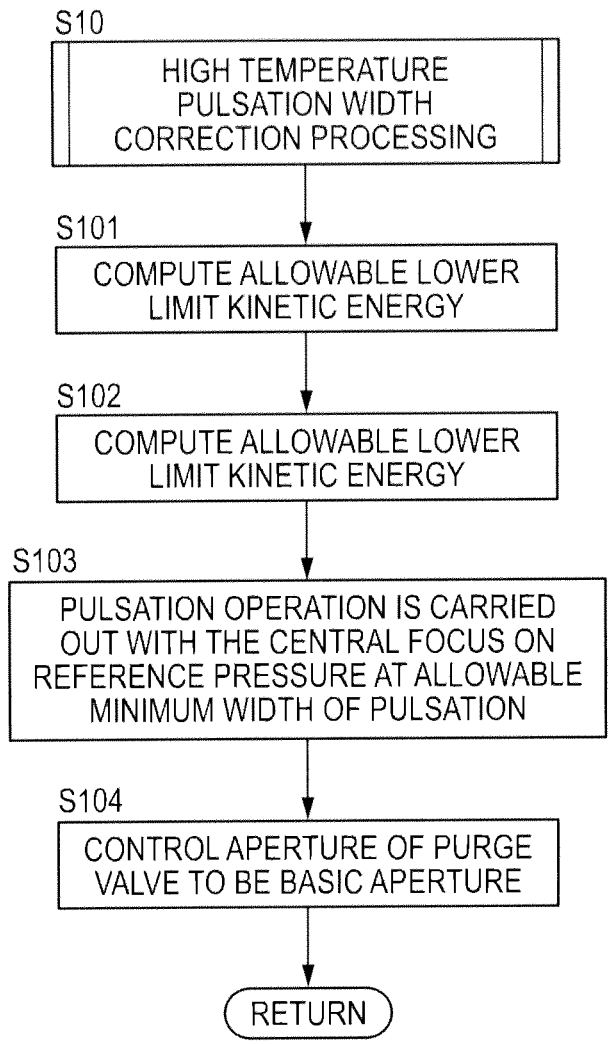
FIG. 13 is a flowchart explaining the high temperature pulsation width correction processing according to the first embodiment of the present invention.

FIG. 13 is a flowchart explaining the high temperature pulsation width correction processing.

Figure 14:
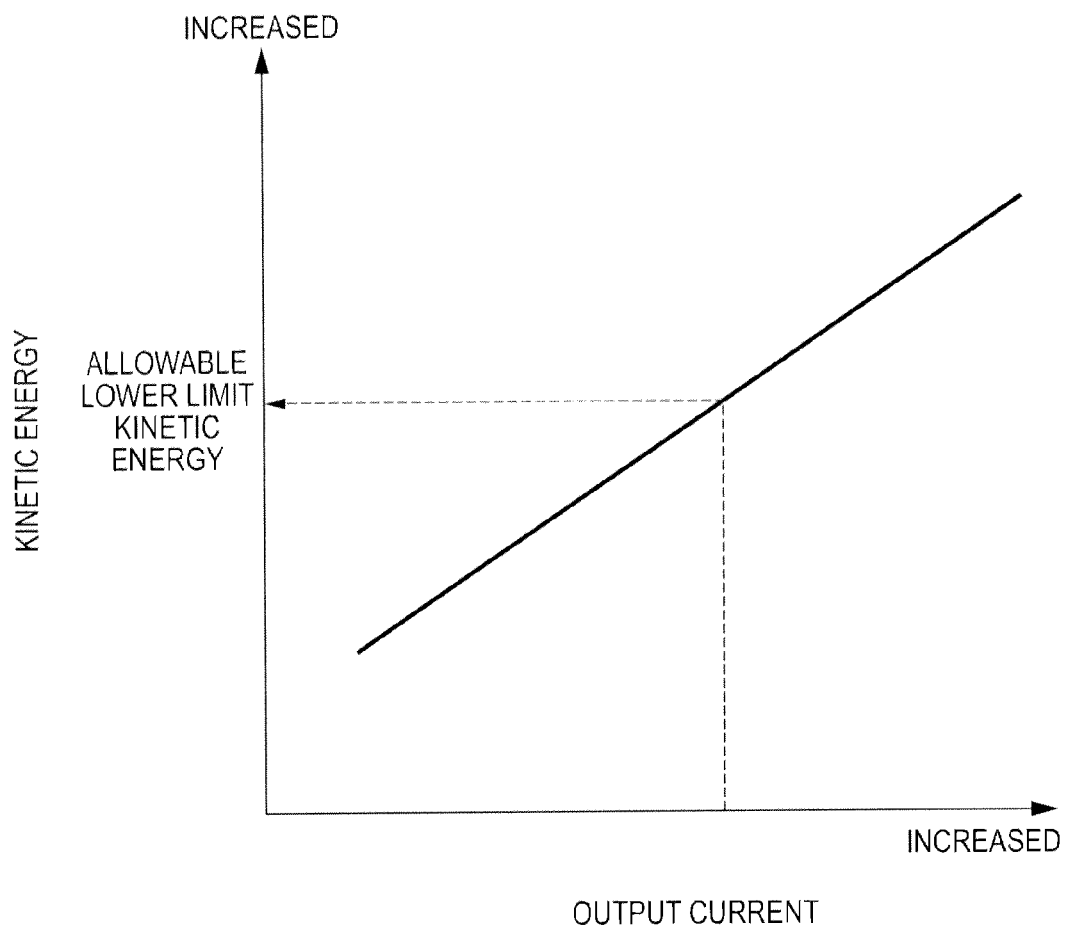
FIG. 14 is a table for computing the allowable lower limit kinetic energy from the output electric current.

The controller 4 computes the allowable lower limit kinetic energy on the basis of the output current with reference to the table illustrated in FIG. 14 in Step S10. As illustrated in FIG. 14, the larger the output current is, the more the allowable lower limit kinetic energy is increased. This is because the larger the output current is, the more water is produced by the above-described electrode reaction (2).

The controller 4 computes the minimum value of the width of the pulsation that does not fall below the allowable lower limit kinetic energy (hereinafter, referred to as "the allowable minimum width of the pulsation") on the basis of the temperature of the buffer tank 36 with reference to the map illustrated in FIG. 15 in Step S102.

Figure 15:
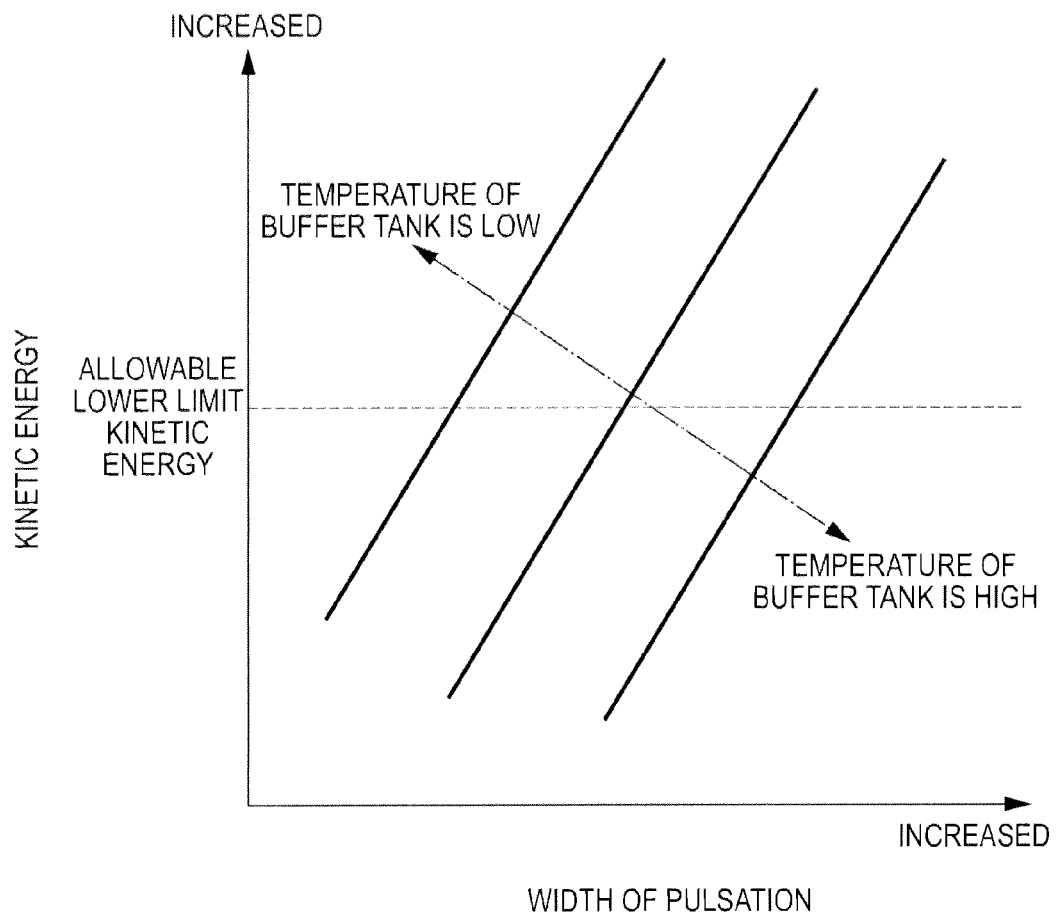
FIG. 15 is a map representing a relation between the width of the pulsation and the kinetic energy of the anode gas upon increase of the anode pressure for each temperature of the buffer tank.

FIG. 15 is a map representing a relation between the width of the pulsation and the kinetic energy of the anode gas upon increase of the anode pressure for each temperature of the buffer tank 36.

As illustrated in FIG. 15, if the temperature of the buffer tank 36 is the same, the kinetic energy of the anode gas is decreased since the smaller the width of the pulsation is, the smaller the amount of the anode gas required for increasing the anode pressure to the upper limit pressure becomes. In addition, if the width of the pulsation is the same, the kinetic energy of the anode gas is decreased since the higher the temperature of the buffer tank 36 is, the smaller the amount of the anode gas required for increasing the anode pressure to the upper limit pressure becomes.

The controller 4 carries out the pulsation operation by periodically increasing and decreasing the anode pressure within the range of the allowable minimum width of the pulsation with the central focus on the reference pressure in Step S103.

The controller 4 controls the aperture of the purge valve to be the basic aperture in Step S104.

Figure 16:
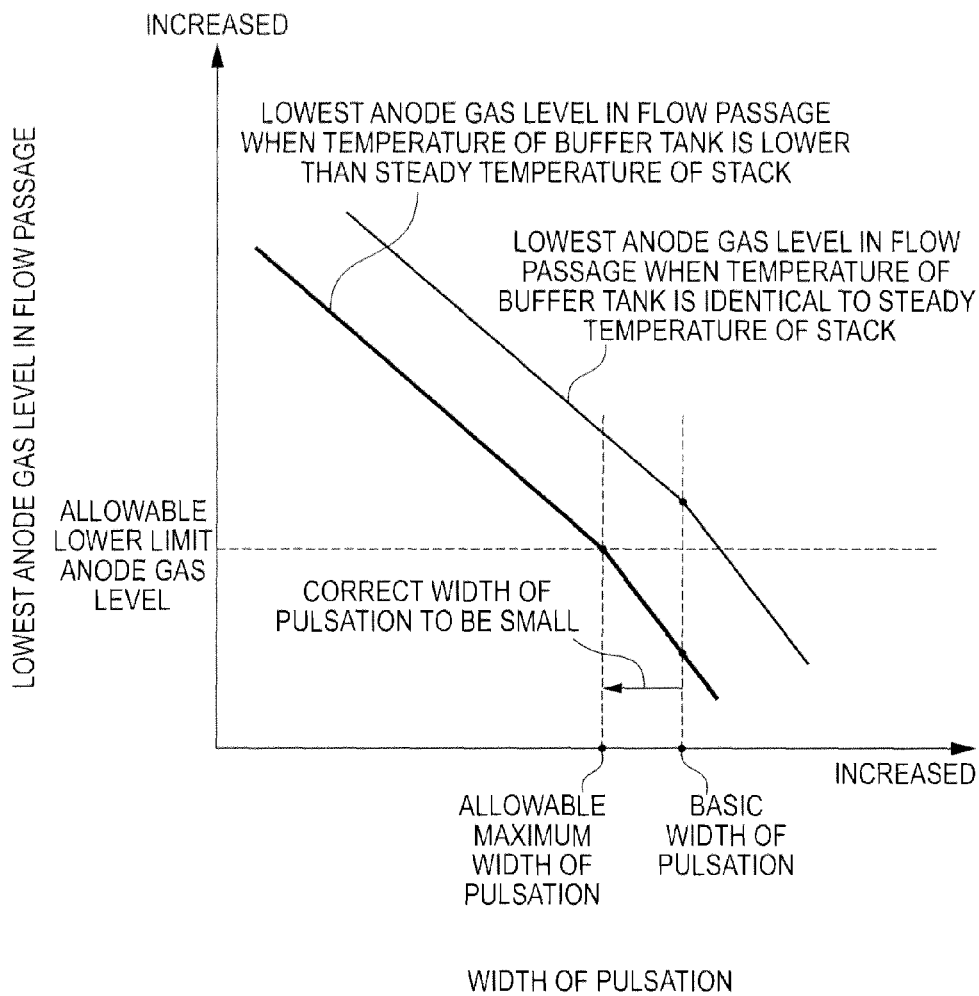
FIG. 16 is a view explaining the action of the low temperature pulsation width correction processing according to the first embodiment of the present invention.

FIG. 16 is a view explaining the action of the low temperature pulsation width correction processing according to the present embodiment. In FIG. 16, a thin solid line illustrates the lowest anode gas level in the flow passage when the temperature of the buffer tank 36 is the steady temperature of the fuel cell stack 2 in accordance with the width of the pulsation. On the other hand, a bold line illustrates the lowest anode gas level in the flow passage when the temperature of the buffer tank 36 is a specific temperature that is lower than the steady temperature of the fuel cell stack 2, namely, a specific temperature that is lower than the second specific temperature in accordance with the width of the pulsation.

As illustrated by the bold line in FIG. 16, if the pulsation operation is carried out when the temperature of the buffer tank 36 is lower than the steady temperature of the fuel cell stack 2, the lowest anode gas level in the flow passage becomes lower than the allowable lower limit anode gas level.

Therefore, the width of the pulsation in the pulsation operation is corrected to be smaller than the basic width of the pulsation on the basis of the temperature of the buffer tank 36 when the temperature of the buffer tank 36 is lower than the steady temperature of the fuel cell stack 2. Specifically, the controller 4 computes the allowable maximum width of the pulsation at which the lowest anode gas level in the flow passage becomes the allowable lower limit anode gas level on the basis of the temperature of the buffer tank 36, carrying out the pulsation operation at the computed allowable maximum width of the pulsation. Thereby, it is possible to prevent the lowest anode gas level in the flow passage from falling below the allowable lower limit anode gas level upon reduction of the anode pressure.

Figure 17:
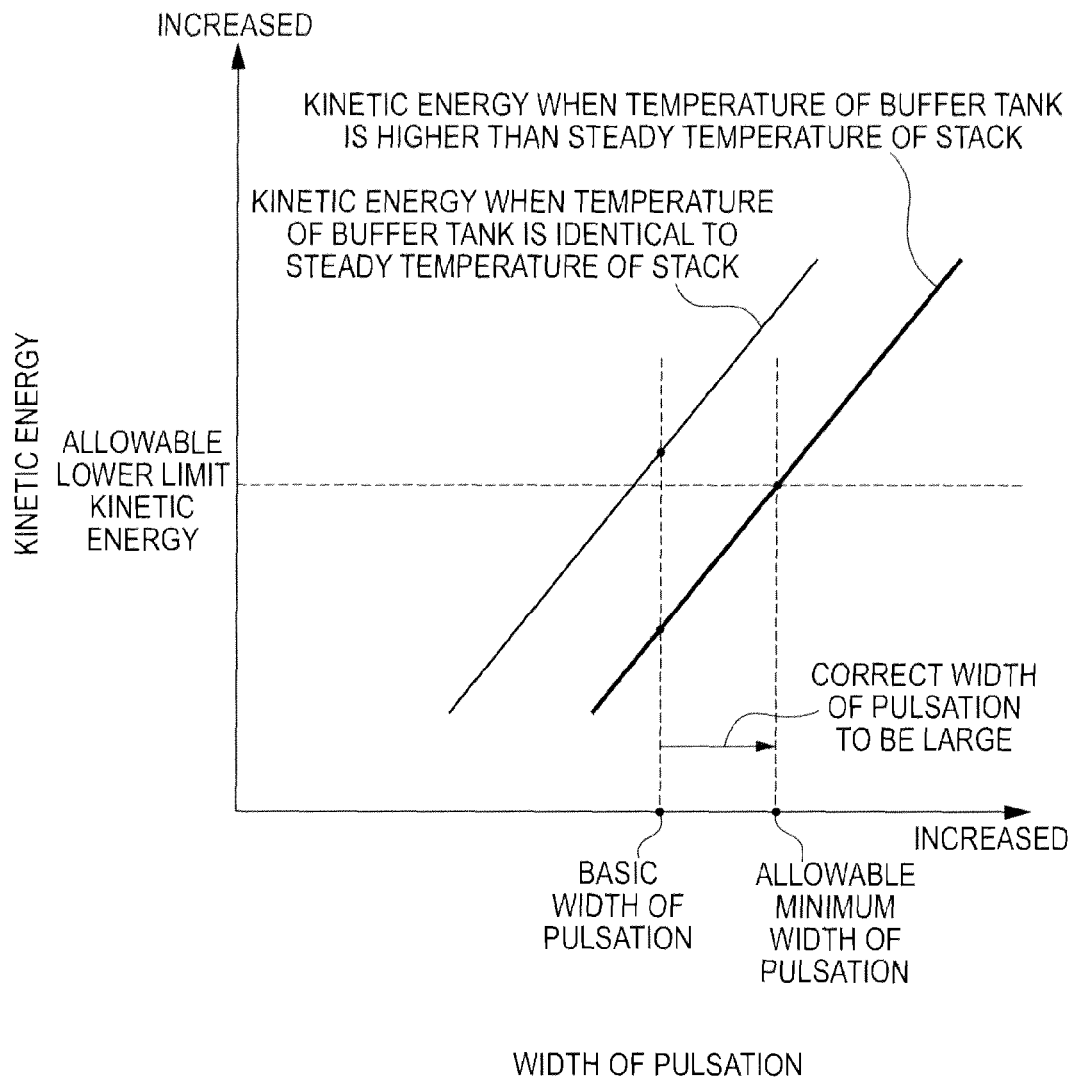
FIG. 17 is a view explaining the action of the high temperature pulsation width correction processing according to the first embodiment of the present invention.

FIG. 17 is a view explaining the action of the high temperature pulsation width correction processing according to the present embodiment. In FIG. 17, a thin solid line illustrates the kinetic energy of the anode gas when the temperature of the buffer tank 36 is the steady temperature of the fuel cell stack 2 in accordance with the width of the pulsation. On the other hand, a bold line illustrates the kinetic energy of the anode gas when the temperature of the buffer tank 36 is a specific temperature that is higher than the steady temperature of the fuel cell stack 2, namely, a specific temperature that is higher than the first specific temperature, in accordance with the width of the pulsation.

As illustrated by the bold line in FIG. 17, if the pulsation operation is carried out when the temperature of the buffer tank 36 is higher than the steady temperature of the fuel cell stack 2, the kinetic energy of the anode gas becomes smaller than the allowable lower limit kinetic energy.

Therefore, the width of the pulsation in the pulsation operation is corrected to be larger than the basic width of the pulsation on the basis of the temperature of the buffer tank 36 when the temperature of the buffer tank 36 is higher than the steady temperature of the fuel cell stack 2. Specifically, the controller 4 computes the allowable minimum width of the pulsation at which the kinetic energy of the anode gas becomes the allowable lower limit kinetic energy on the basis of the temperature of the buffer tank 36, carrying out the pulsation operation at the computed allowable minimum width of the pulsation. Thereby, it is possible to prevent the kinetic energy of the anode gas from falling below the allowable lower limit kinetic energy upon increase of the anode pressure.

According to the above-described present embodiment, the width of the pulsation in the case of carrying out the pulsation operation is corrected on the basis of the temperature of the buffer tank 36.

Specifically, when the temperature of the buffer tank 36 is lower than the steady temperature of the fuel cell stack 2, namely, lower than the second specific temperature, the width of the pulsation in the pulsation operation is made smaller than the width of the pulsation that is set when the temperature of the buffer tank 36 is substantially identical to the steady temperature of the fuel cell stack 2.

Thereby, it is possible to prevent the lowest anode gas level in the flow passage from falling below the allowable lower limit anode gas level upon reduction of the anode pressure since the time until the anode pressure falls below the lower limit pressure becomes short. Accordingly, there is no possibility that the voltage is turned to a negative voltage due to inhibition of the above-descried electrode reactions (1) and (2), and this makes it possible to carry out stable electric power generation and to prevent deterioration of the fuel cell 10.

In addition, when the temperature of the buffer tank 36 is higher than the steady temperature of the fuel cell stack 2, namely, higher than the first specific temperature, the width of the pulsation in the pulsation operation is made larger than the width of the pulsation that is set when the temperature of the buffer tank 36 is substantially identical to the steady temperature of the fuel cell stack 2.

Thereby, it is possible to prevent the kinetic energy of the anode gas from falling below the allowable lower limit kinetic energy since the kinetic energy of the anode gas is increased for the increased amount of the width of the pulsation. Therefore, the discharge performance of liquid water can be ensured, making it possible to prevent flooding from being generated in the anode gas flow passage 121.

Second Embodiment

Subsequently, the second embodiment of the present invention will be described. The present embodiment is different from the first embodiment in that the aperture of the purge valve 38 is corrected in accordance with the moisture status of the electrolyte membrane 111. Hereinafter, the different point will be mainly described. In the following embodiment, the parts with the same functions as the above-described first embodiment are provided with the same reference codes and the description thereof is herein omitted.

In the first embodiment, when the temperature of the buffer tank 36 is lower than the steady temperature of the fuel cell stack 2, the width of the pulsation in the pulsation operation is smaller than the width of the pulsation that is set when the temperature of the buffer tank 36 is substantially identical to the steady temperature of the fuel cell stack 2.

However, if the width of the pulsation in the pulsation operation is made small, the kinetic energy of the anode gas upon increase of the anode pressure is decreased, then the discharge performance of liquid water in the interior of the anode gas flow passage 121 is deteriorated. Accordingly, when the electrolyte membrane 111 is in a wet state with a high water content, it is preferable that the reduced width from the basic width of the pulsation is made small as much as possible.

Figure 18:
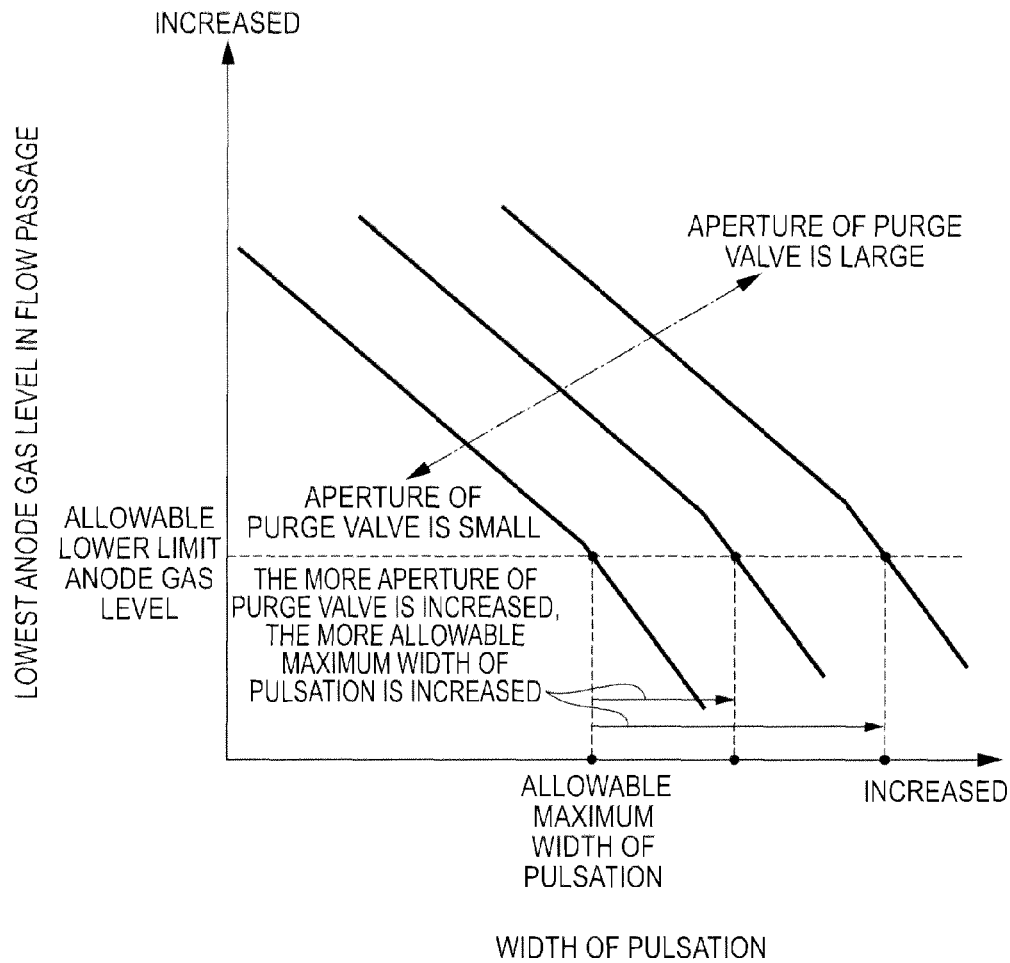
FIG. 18 is a view illustrating a relation between a width of the pulsation ΔP and the lowest anode gas level in the flow passage when the temperature of the buffer tank is a specific temperature in accordance with the aperture of the purge valve.

FIG. 18 is a view illustrating a relation between a width of the pulsation and the lowest anode gas level in the flow passage when the temperature of the buffer tank 36 is a specific temperature in accordance with the aperture of a purge valve 38.

As illustrated in FIG. 18, the higher the anode gas level in the interior of the buffer tank 36 is made by increasing the aperture of the purge valve 38, the higher the lowest anode gas level in the flow passage with the same width of the pulsation upon reduction of the anode pressure is made. This is because the higher the anode gas level in the interior of the buffer tank 36 is made, the more nitrogen in the anode-off gas to flow backward from the buffer tank 36 side into the anode gas flow passage 121 is reduced, then nitrogen stored in the vicinity of the stagnation point is also reduced.

Accordingly, as illustrated in FIG. 18, the larger the aperture of the purge valve 38 is made, the larger the allowable maximum width of the pulsation is made.

Therefore, according to the present embodiment, when the electrolyte membrane 111 is in a moisture status, the anode gas level in the interior of the purge valve 38 is made higher than usual by increasing the aperture of the purge valve 38. Thereby, it is possible to increase the allowable maximum width of the pulsation, making it possible to reduce the reduced width in the width of the pulsation from the basic width of the pulsation.

Figure 19:
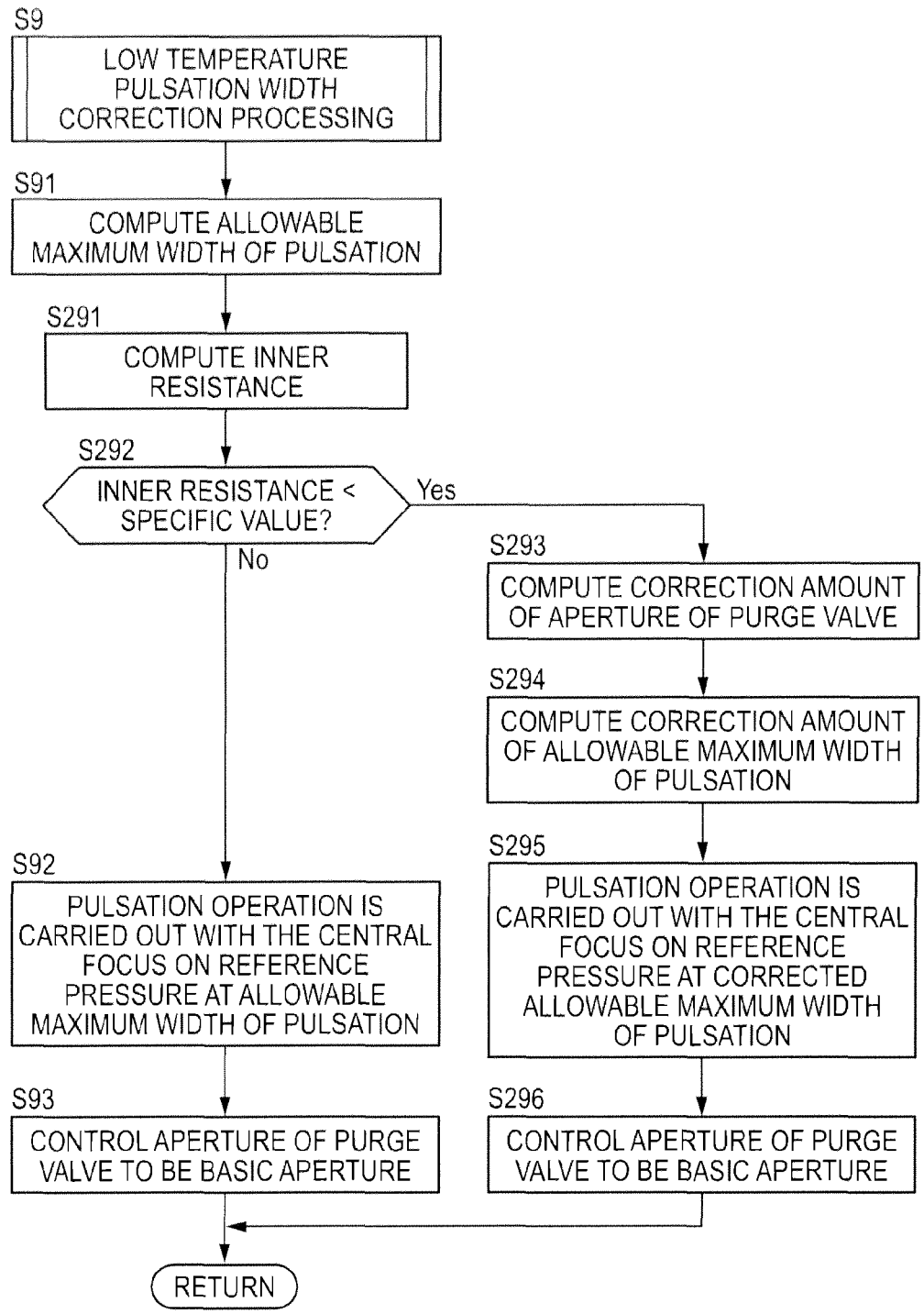
FIG. 19 is a flowchart explaining the low temperature pulsation width correction processing according to a second embodiment of the present invention.

FIG. 19 is a flowchart explaining the low temperature pulsation width correction processing according to the present embodiment.

The controller 4 computes an inner high frequency resistance (HFR: High Frequency Resistance) (hereinafter, referred to as "an inner resistance") of the fuel cell stack 2 in order to determine the moisture status of the electrolyte membrane 111 in Step S291. It has been known that there is a correlation between the moisture status of the electrolyte membrane 111 and the inner resistance of the fuel cell stack 2, in which correlation, the lower the inner resistance of the fuel cell stack 2 is, the more the moisture in the membrane exists, then the electrolyte membrane 111 is in the moisture status.

The controller 4 determines whether or not the inner resistance of the fuel cell stack 2 is smaller than a specific value in Step S292. The controller 4 determines that the electrolyte membrane 111 is in the moisture status if the inner resistance of the fuel cell stack 2 is smaller than the specific value, carrying out the processing of Step S293. On the other hand, if the inner resistance of the fuel cell stack 2 is not less than the specific value, the controller 4 carries out the processing of Step S92.

Figure 20:
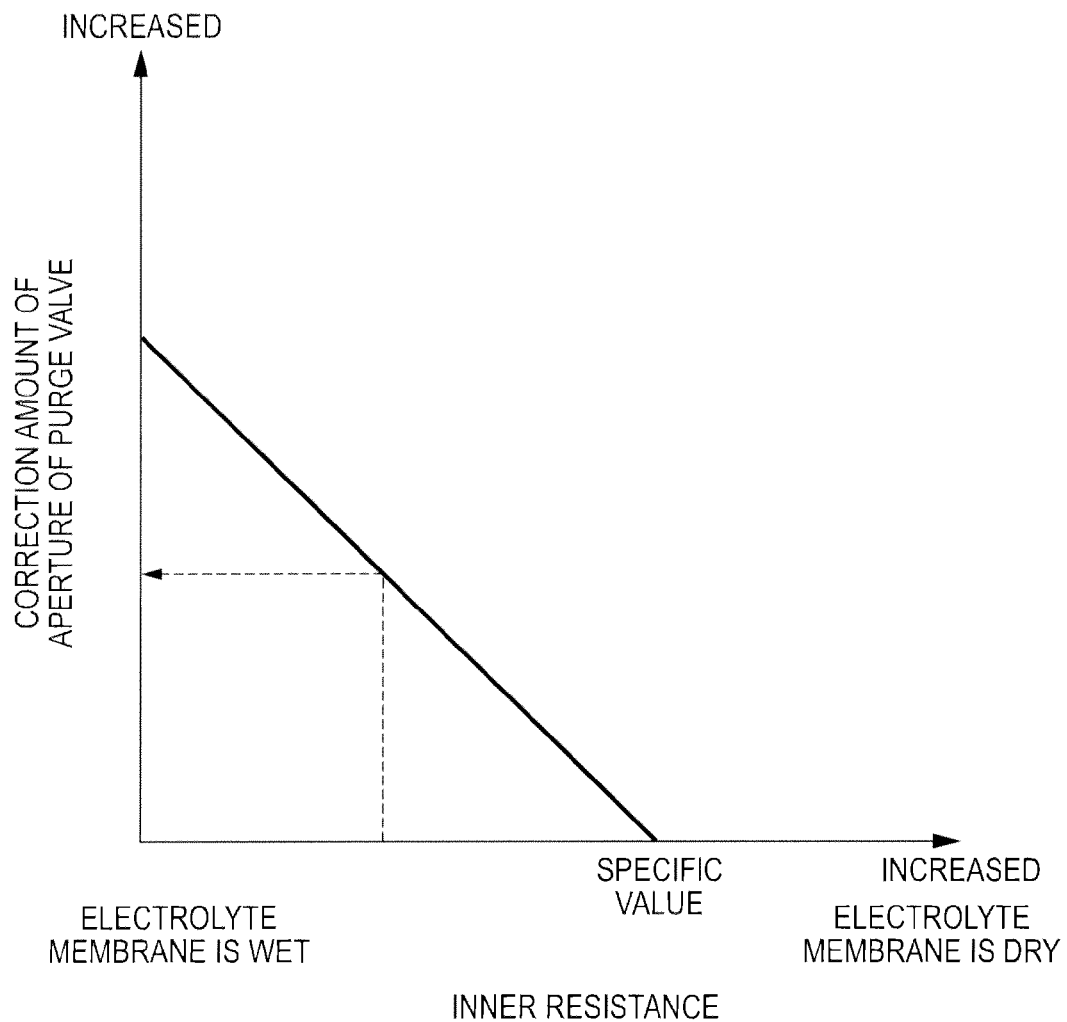
FIG. 20 is a table for computing the correction amount of the aperture of the purge valve from the internal resistance.

The controller 4 computes the correction amount of the aperture of the purge valve 38 on the basis of the inner resistance of the fuel cell stack 2 with reference to the table illustrated in FIG. 20 in Step S293. As illustrated in FIG. 20, the smaller the inner resistance of the fuel cell stack 2 is, namely, the more the moisture in the membrane of the electrolyte membrane 111 exists, the aperture of the purge valve 38 is increased by increasing the correction amount of the aperture of the purge valve 38.

Figure 21:
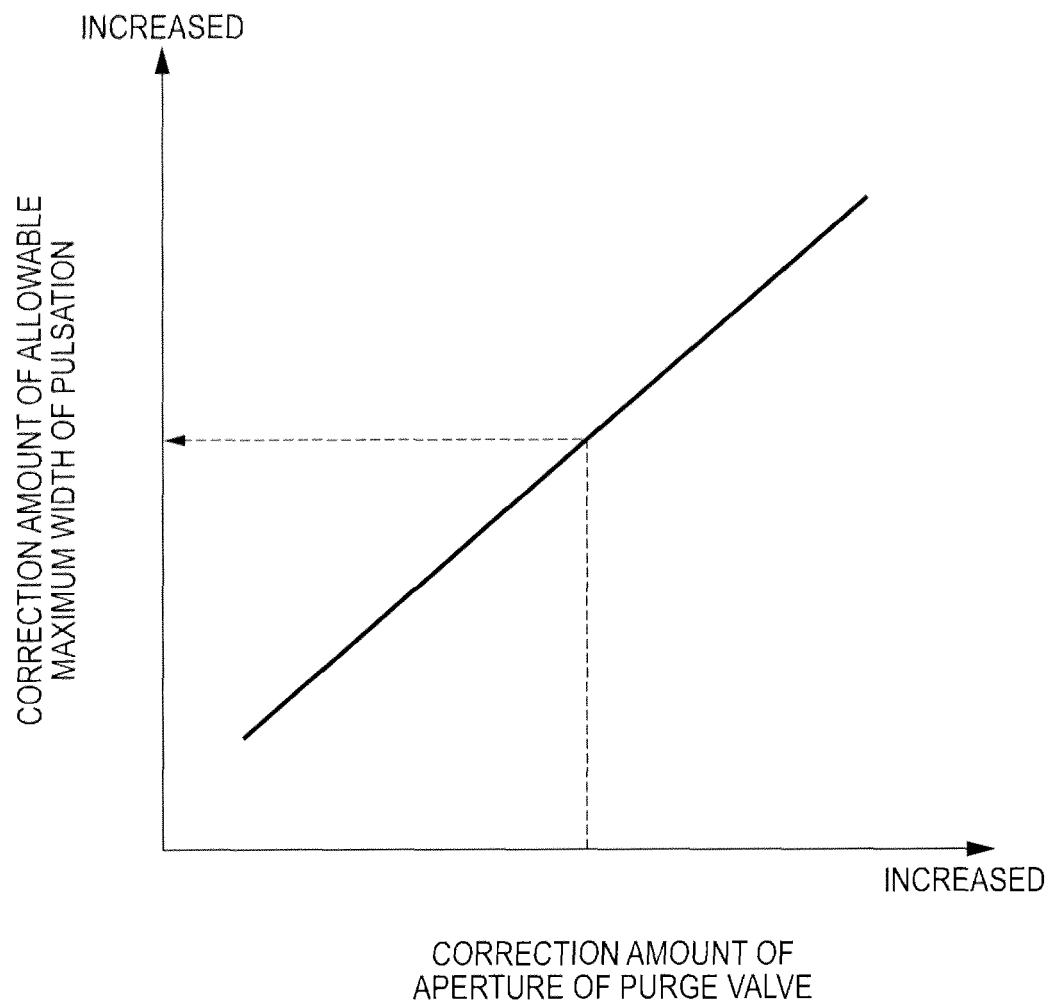
FIG. 21 is a table for computing the correction amount of the allowable maximum width of the pulsation from the correction amount of the aperture of the purge valve.

The controller 4 computes the correction amount of the allowable maximum width of the pulsation on the basis of the correction amount of the aperture of the purge valve 38 with reference to the table illustrated in FIG. 21 in Step S294. As illustrated in FIG. 21, the larger the correction amount of the aperture of the purge valve 38 is, the larger the correction amount of the allowable maximum width of the pulsation becomes.

The controller 4 carries out the pulsation operation at the width of the pulsation in which the correction amount is added to the allowable maximum width of the pulsation (hereinafter, referred to as "a corrected allowable maximum width of the pulsation") with the central focus on the reference pressure in Step S295.

The controller 4 controls the aperture of the purge valve 38 to be the corrected aperture in which the correction amount of the aperture is added to the basic aperture in Step S296.

Figure 22:
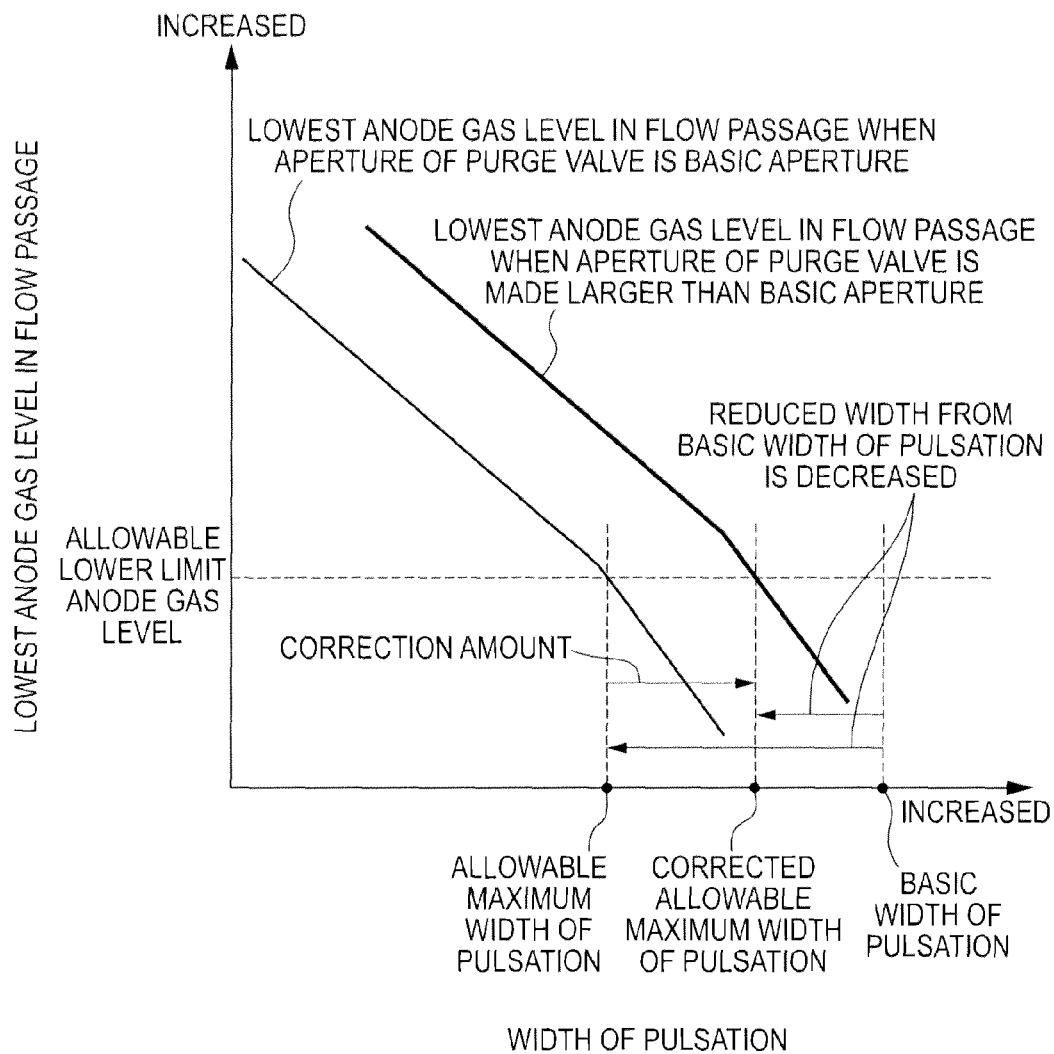
FIG. 22 is a view explaining the action of the low temperature pulsation width correction processing according to the second embodiment of the present invention.

FIG. 22 is a view explaining the action of the low temperature pulsation width correction processing according to the present embodiment. In FIG. 22, a thin solid line illustrates the lowest anode gas level in the flow passage when the temperature of the buffer tank is a specific temperature that is lower than the steady temperature of the fuel cell stack and the aperture of the purge valve is a basic aperture in accordance with the width of the pulsation. On the other hand, a bold line illustrates the lowest anode gas level in the flow passage when the temperature of the buffer tank is a specific temperature that is lower than the steady temperature of the fuel cell stack and the aperture of the purge valve is larger than the basic aperture in accordance with the width of the pulsation.

As represented by a bold line in FIG. 22, when the temperature of the buffer tank is lower than the steady temperature of the fuel cell stack and the electrolyte membrane 111 is in the moisture status, the aperture of the purge valve 38 is made larger than the basic aperture in accordance with the inner resistance of the fuel cell stack 2. Thereby, it is possible to increase the allowable maximum width of the pulsation to the corrected allowable maximum width of the pulsation since the lowest anode gas level in the flow passage can be made higher, making it possible to decrease the reduced width in the width of the pulsation from the basic width of the pulsation.

As a result, according to the present embodiment, the same advantages as the first embodiment can be obtained and further, the discharge performance of liquid water when the electrolyte membrane 111 is in the moisture status can be improved and this makes it possible to further prevent flooding from being generated in the anode gas flow passage 121.

Third Embodiment

Subsequently, the third embodiment of the present invention will be described. The present embodiment is different from the first embodiment in that the width of the pulsation is made larger and the aperture of the purge valve 38 is corrected upon carrying out the high temperature pulsation width correction processing. Hereinafter, the different point will be mainly described.

Figure 23:
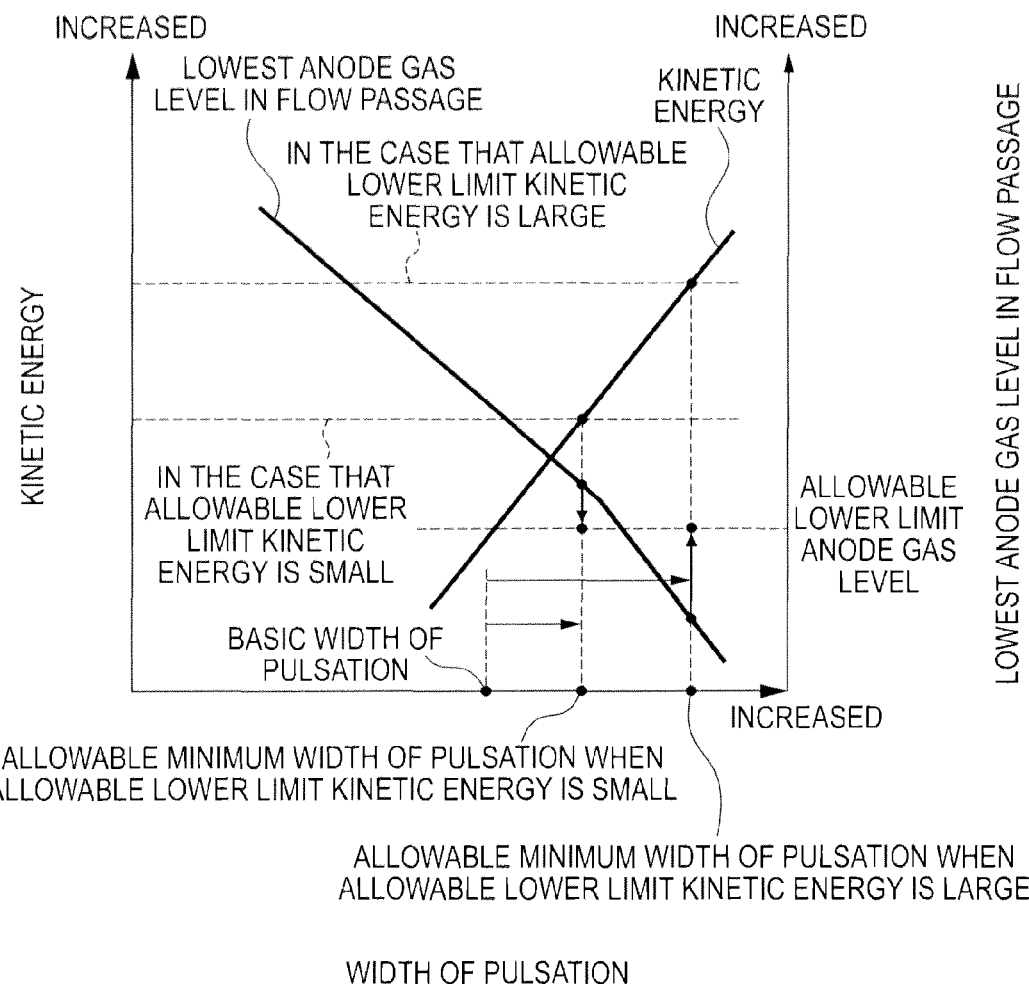
FIG. 23 is a view illustrating a relation between the width of the pulsation, the kinetic energy of the anode gas, and the lowest anode gas level in the flow passage when the temperature of the buffer tank is a specific temperature higher than the steady temperature of the fuel cell stack.

FIG. 23 is a view illustrating a relation between the width of the pulsation, the kinetic energy of the anode gas, and the lowest anode gas level in the flow passage when the temperature of the buffer tank 36 is a specific temperature that is higher than the steady temperature of the fuel cell stack 2.

As illustrated in FIG. 23, according to the first embodiment, when the temperature of the buffer tank 36 is higher than the steady temperature of the fuel cell stack 2, the pulsation operation is carried out at the allowable minimum width of the pulsation by correcting the width of the pulsation in the pulsation operation to be larger than the basic width of the pulsation in order to prevent the kinetic energy of the anode gas does from falling below the allowable lower limit kinetic energy.

However, the allowable lower limit kinetic energy is varied in accordance with the operation status of the fuel cell system. Therefore, as illustrated in FIG. 23, in the case that the allowable lower limit kinetic energy is comparatively small, the lowest anode gas level in the flow passage when the pulsation operation is carried out at the allowable minimum width of the pulsation is sometimes higher than the allowable lower limit anode gas level.

On the other hand, in the case that the allowable lower limit kinetic energy is comparatively large, the lowest anode gas level in the flow passage when the pulsation operation is carried out at the allowable minimum width of the pulsation is sometimes lower than the allowable lower limit anode gas level.

Therefore, according to the present embodiment, when the controller 4 determines that the lowest anode gas level in the flow passage during the pulsation operation at the allowable minimum width of the pulsation is larger than the allowable lower limit anode gas level, the aperture of the purge valve 38 is made smaller than the basic aperture in order to decrease the lowest anode gas level in the flow passage to the allowable lower limit anode gas level. Thereby, it is possible to reduce the anode gas amount to be discharged from the purge passage, making it possible to improve a fuel efficiency.

On the other hand, when the controller 4 determines that the lowest anode gas level in the flow passage during the pulsation operation at the allowable minimum width of the pulsation is lower than the allowable lower limit anode gas level, the aperture of the purge valve 38 is made larger than the basic aperture in order to increase the lowest anode gas level in the flow passage to the allowable lower limit anode gas level. Hereinafter, the high temperature pulsation width correction processing according to the present embodiment will be described.

Figure 24:
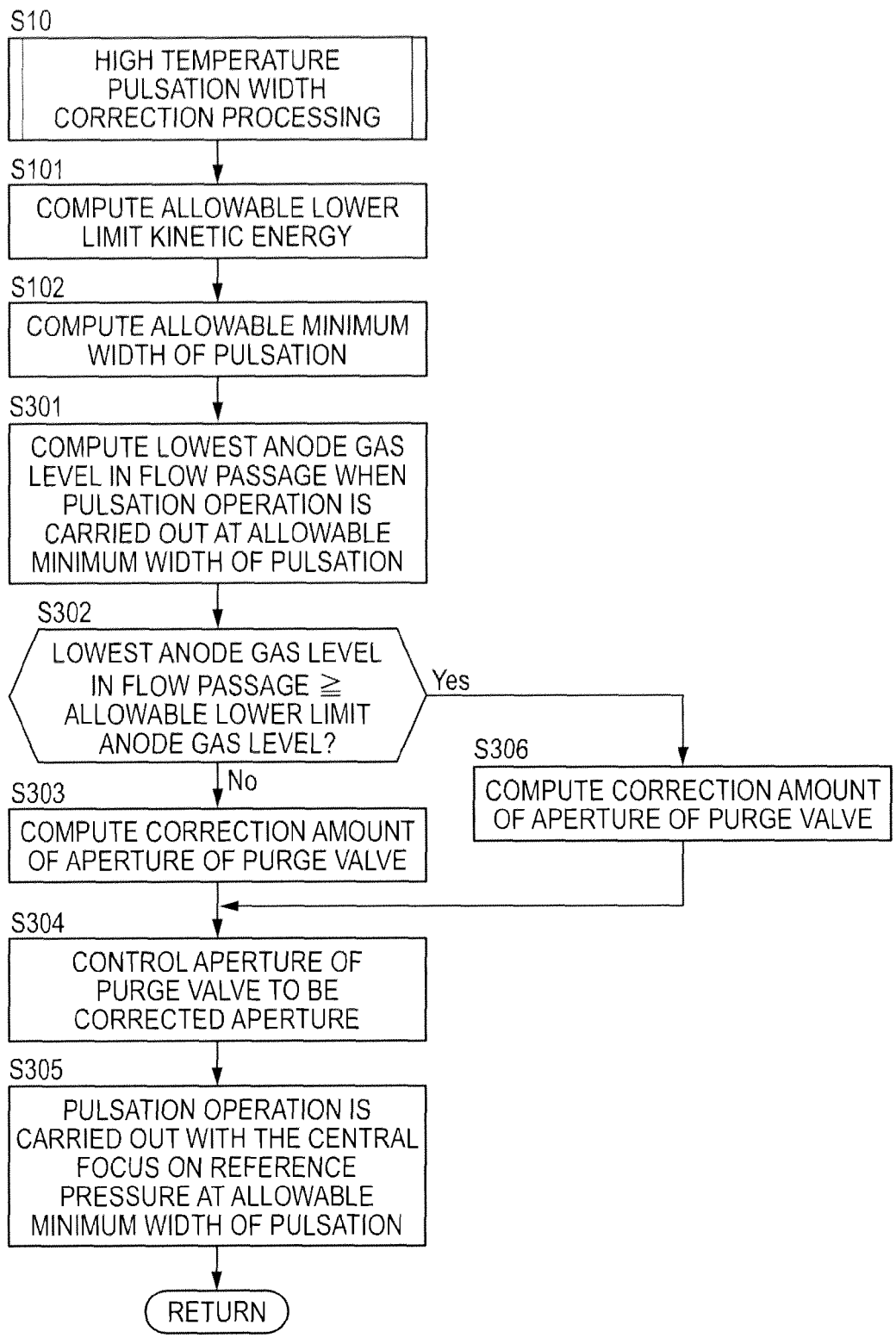
FIG. 24 is a flowchart explaining the high temperature pulsation width correction processing according to a third embodiment of the present invention.

FIG. 24 is a flowchart explaining the high temperature pulsation width correction processing according to the present embodiment.

The controller 4 computes the lowest anode gas level in the flow passage during the pulsation operation at the allowable minimum width of the pulsation with reference to the above-described map of FIG. 12 in Step S301.

The controller 4 determines whether or not the computed lowest anode gas level in the flow passage is not less than the allowable lower limit anode gas level in Step S302. The controller 4 carries out the processing of Step S303 if the computed lowest anode gas level in the flow passage is not less than the allowable lower limit anode gas level. On the other hand, if the computed lowest anode gas level in the flow passage is lower than the allowable lower limit anode gas level, the processing of Step S306 is carried out.

Figure 25:
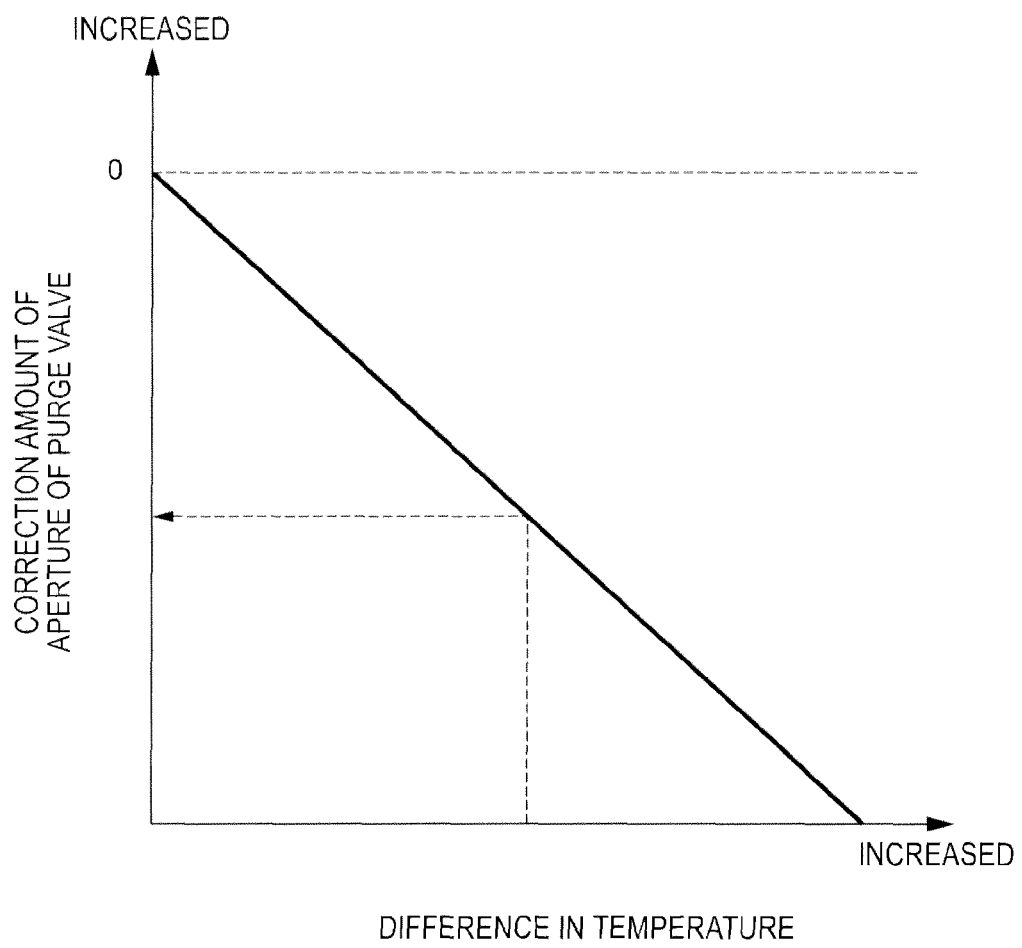
FIG. 25 is a table for computing the correction amount of the aperture of the purge valve from the difference in level.

The controller 4 computes the correction amount of the aperture of the purge valve 38 on the basis of the difference in level obtained by subtracting the allowable lower limit anode gas level from the computed lowest anode gas level in the flow passage with reference to the table illustrated in FIG. 25 in Step S303. As illustrated in FIG. 25, the correction amount of the aperture of the purge valve 38 is set such that the larger the level difference becomes, the smaller the aperture of the purge valve 38 becomes compared to the basic aperture.

The controller 4 makes the aperture of the purge valve 38 to be the corrected aperture in which the correction amount of the aperture is added to the basic aperture of the purge valve 38 in Step S304.

The controller 4 carries out the pulsation operation at the allowable maximum width of the pulsation with the central focus on the reference pressure in Step S305.

Figure 26:
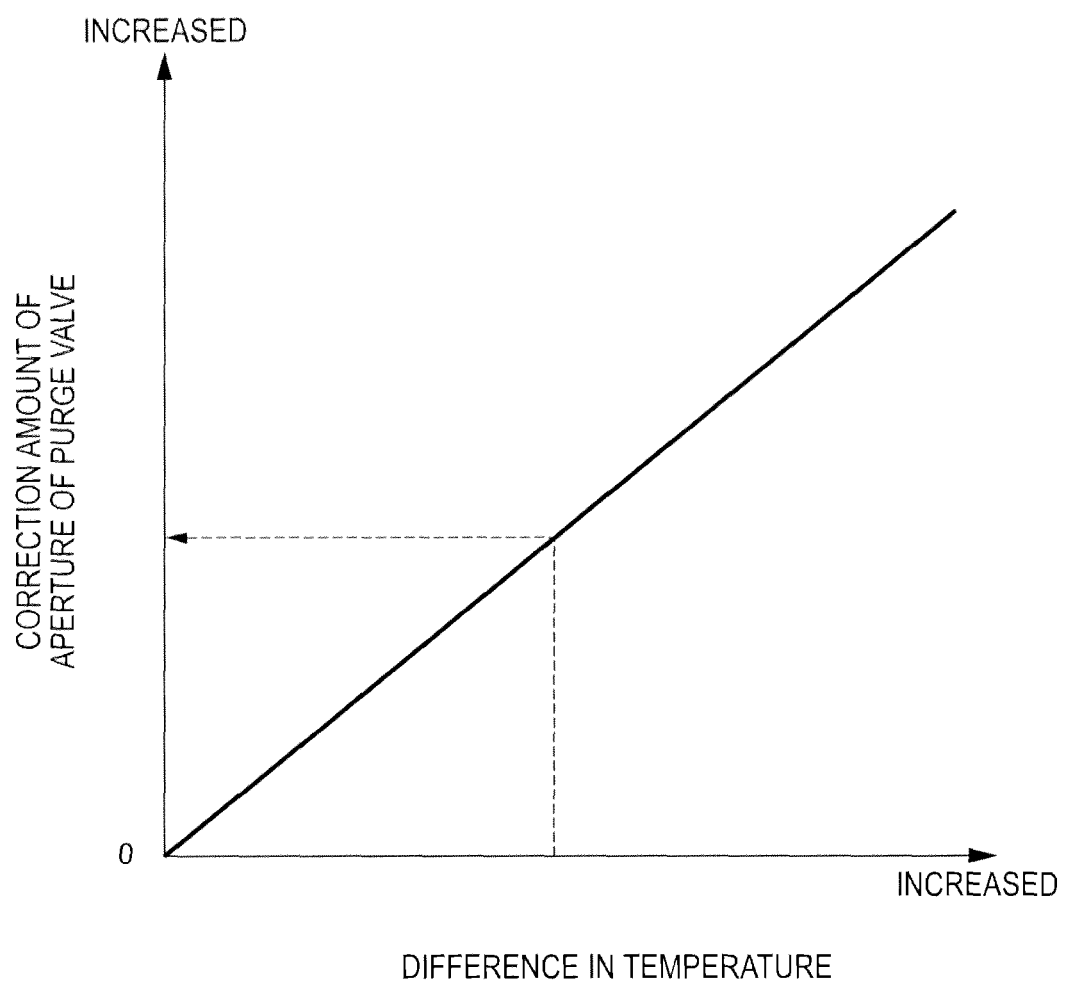
FIG. 26 is a table for computing the correction amount of the aperture of the purge valve from the difference in level.

The controller 4 computes the correction amount of the aperture of the purge valve 38 on the basis of the difference in level obtained by subtracting the allowable lower limit anode gas level from the computed lowest anode gas level in the flow passage with reference to the table illustrated in FIG. 26 in Step S306. As illustrated in FIG. 26, the correction amount of the aperture of the purge valve 38 is set such that the larger the level difference becomes, the larger the aperture of the purge valve 38 becomes compared to the basic aperture.

Subsequently, the action of the high temperature pulsation width correction processing according to the present embodiment will be described with reference to FIG. 27 and FIG. 28.

Figure 27:
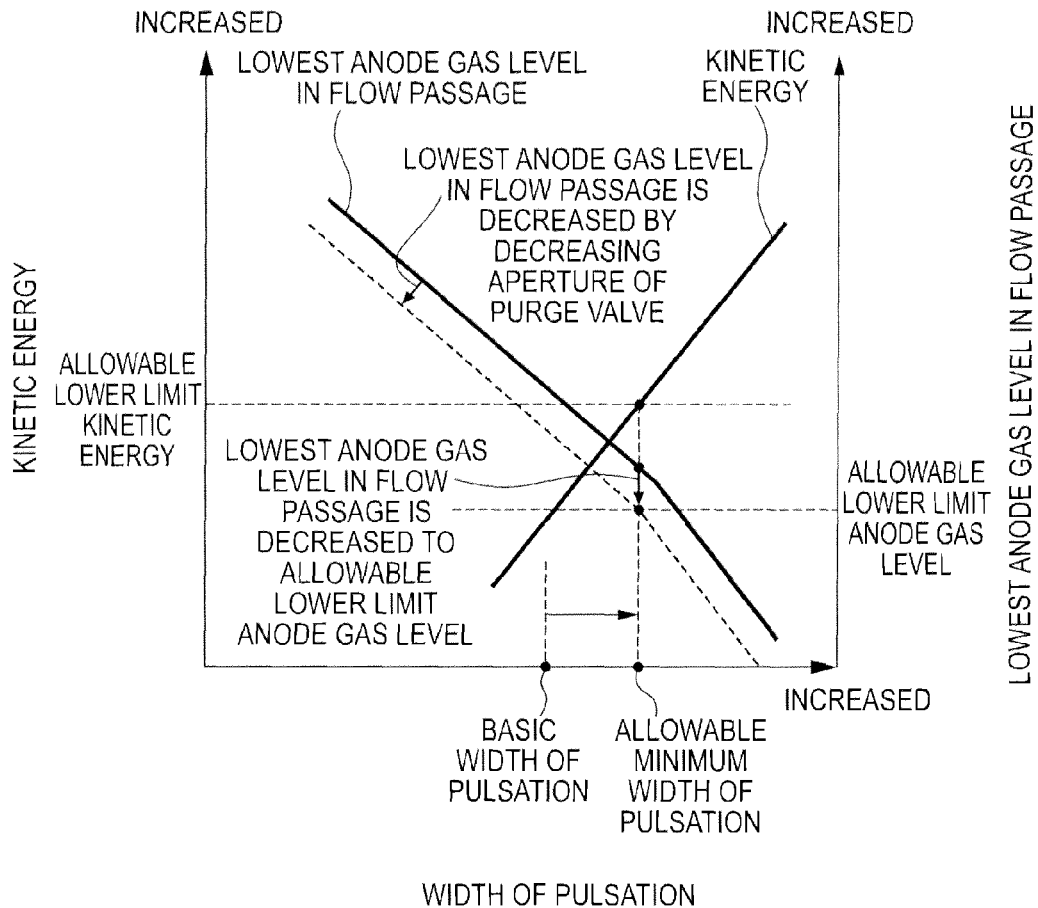
FIG. 27 is a view explaining the action of the high temperature pulsation width correction processing according to the third embodiment of the present invention.

FIG. 27 is a view explaining the action in the case that the lowest anode gas level in the flow passage during the pulsation operation at the allowable minimum width of the pulsation is higher than the allowable lower limit anode gas level.

As illustrated in FIG. 27, in the case that the pulsation operation is carried out at the allowable minimum width of the pulsation, when the lowest anode gas level in the flow passage is higher than the allowable lower limit anode gas level, the aperture of the purge valve 38 is made smaller than the basic aperture in order to decrease the lowest anode gas level in the flow passage to the allowable lower limit anode gas level. Thereby, it is possible to reduce the anode gas amount to be discharged from the purge passage, making it possible to improve a fuel efficiency.

Figure 28:
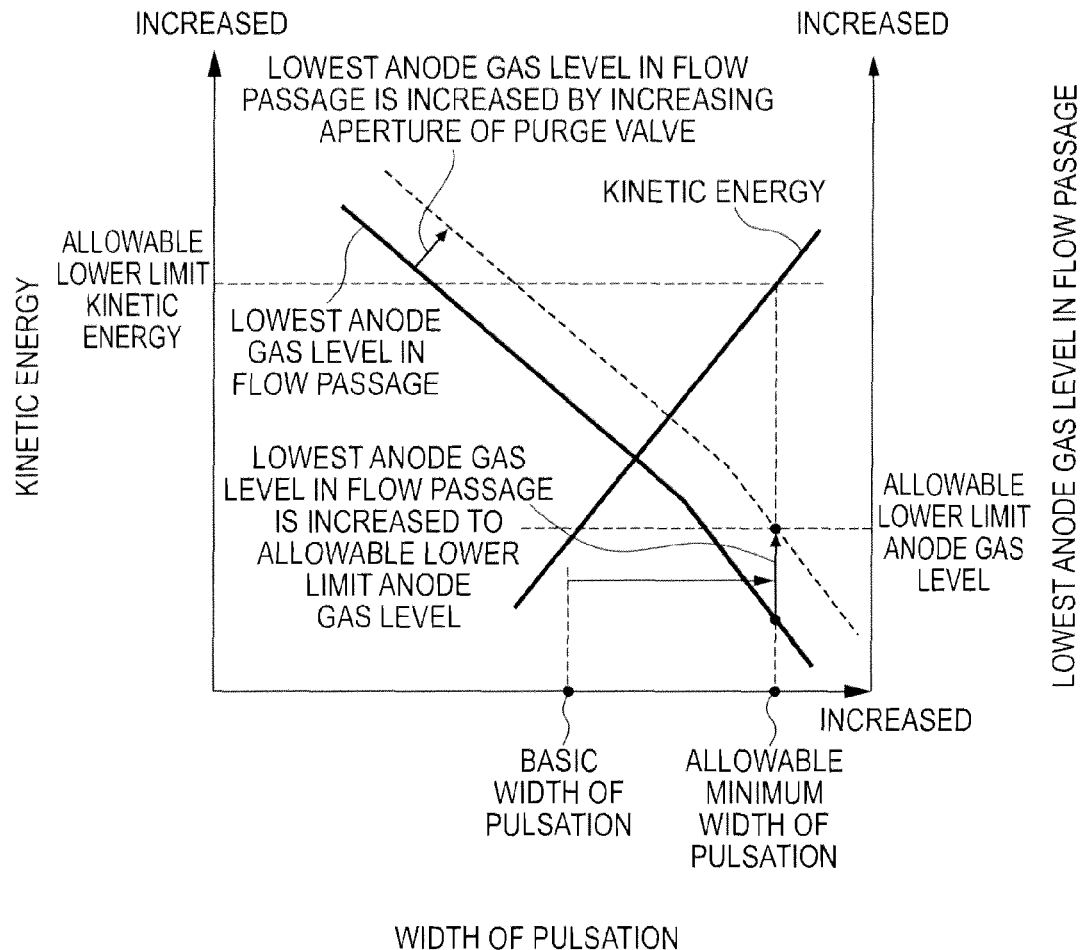
FIG. 28 is a view explaining the action of the high temperature pulsation width correction processing according to the third embodiment of the present invention.

FIG. 28 is a view explaining the action in the case that the lowest anode gas level in the flow passage during the pulsation operation at the allowable minimum width of the pulsation is the allowable lower limit anode gas level.

As illustrated in FIG. 28, in the case that the pulsation operation is carried out at the allowable minimum width of the pulsation, when the lowest anode gas level in the flow passage falls below the allowable lower limit anode gas level, the aperture of the purge valve 38 is made larger than the basic aperture in order to increase the lowest anode gas level in the flow passage to the allowable lower limit anode gas level. Thereby, it is possible to carry out more stable electric generation since the lowest anode gas level in the flow passage can be prevented from falling below the allowable lower limit anode gas level even if the temperature of the buffer tank 36 is higher than the steady temperature of the fuel cell stack 2.

According to the above-described present embodiment, when the temperature of the buffer tank 36 is higher than the steady temperature of the fuel cell stack 2, the width of the pulsation in the pulsation operation is corrected to be larger than the basic width of the pulsation in order to prevent the kinetic energy of the anode gas from falling below the allowable lower limit kinetic energy, carrying out the pulsation operation at the allowable minimum width of the pulsation.

Then, when the lowest anode gas level in the flow passage during the pulsation operation at the allowable minimum width of the pulsation is higher than the allowable lower limit anode gas level, the aperture of the purge valve 38 is made smaller than the basic aperture in order to decrease the lowest anode gas level in the flow passage to the allowable lower limit anode gas level. Thereby, it is possible to reduce the anode gas amount to be discharged from the purge passage, making it possible to improve a fuel efficiency.

On the other hand, when the lowest anode gas level in the flow passage during the pulsation operation at the allowable minimum width of the pulsation is lower than the allowable lower limit anode gas level, the aperture of the purge valve 38 is made larger than the basic aperture in order to increase the lowest anode gas level in the flow passage to the allowable lower limit anode gas level. Thereby, it is possible to carry out more stable electric generation even if the temperature of the buffer tank 36 is higher than the steady temperature of the fuel cell stack 2 since the lowest anode gas level in the flow passage can be prevented from falling below the allowable lower limit anode gas level.

Fourth Embodiment

Subsequently, the fourth embodiment of the present invention will be described. The present embodiment is different from the first embodiment in that the aperture of purge valve 38 is only corrected in order to prevent the lowest anode gas level in the flow passage from falling below the allowable lower limit anode gas level when the temperature of the buffer tank 36 is lower than the steady temperature of the fuel cell stack 2. Hereinafter, the different point will be mainly described.

Figure 29:
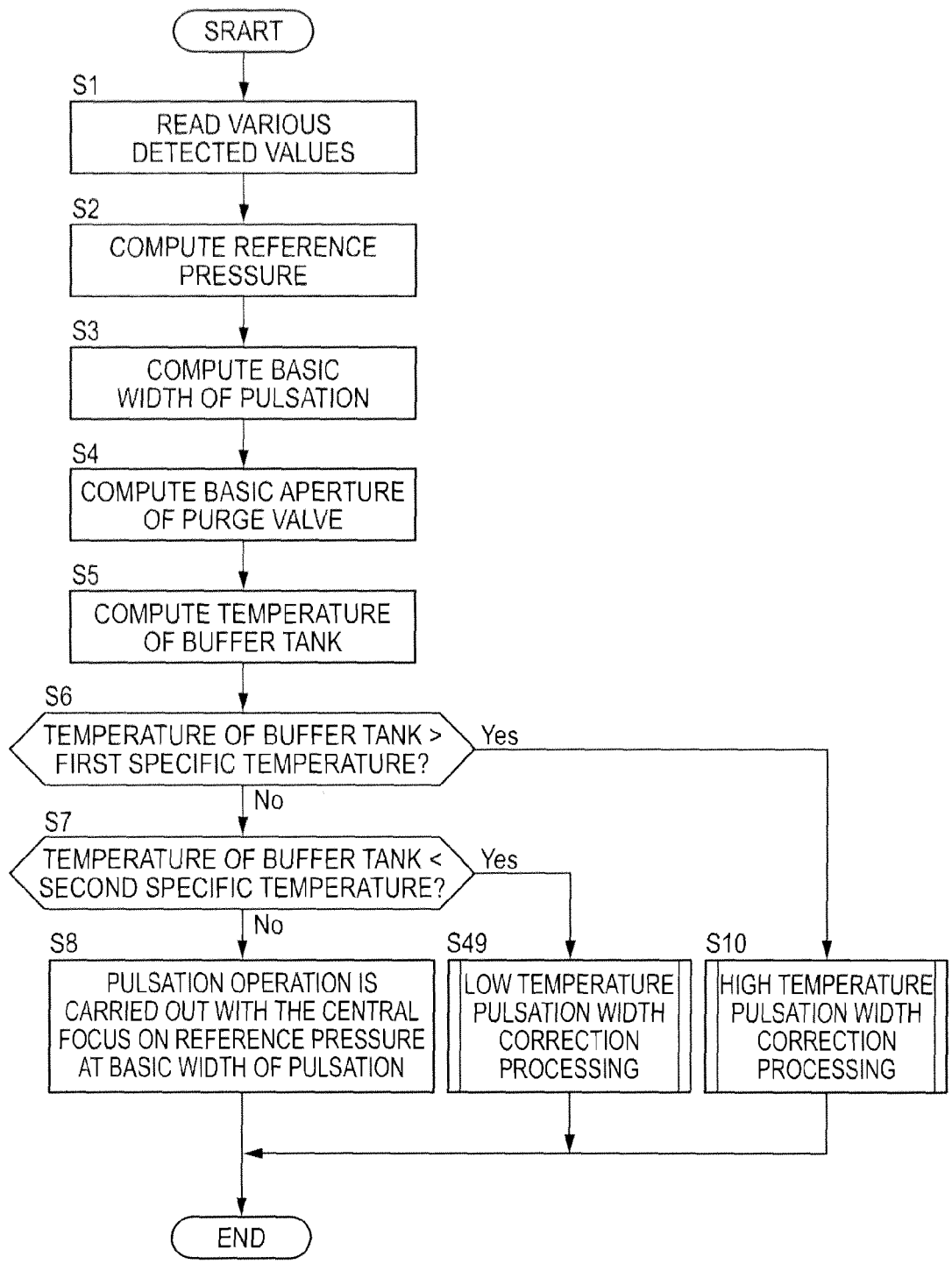
FIG. 29 is a flowchart explaining the control of the pulsation operation according to a fourth embodiment of the present invention.

FIG. 29 is a flowchart explaining the control of the pulsation operation according to the present embodiment. The controller 4 repeatedly carries out the present routine for each specific time (for example, 10 ms).

The controller 4 carries out the low temperature pulsation width correction processing in Step S49.

Figure 30:
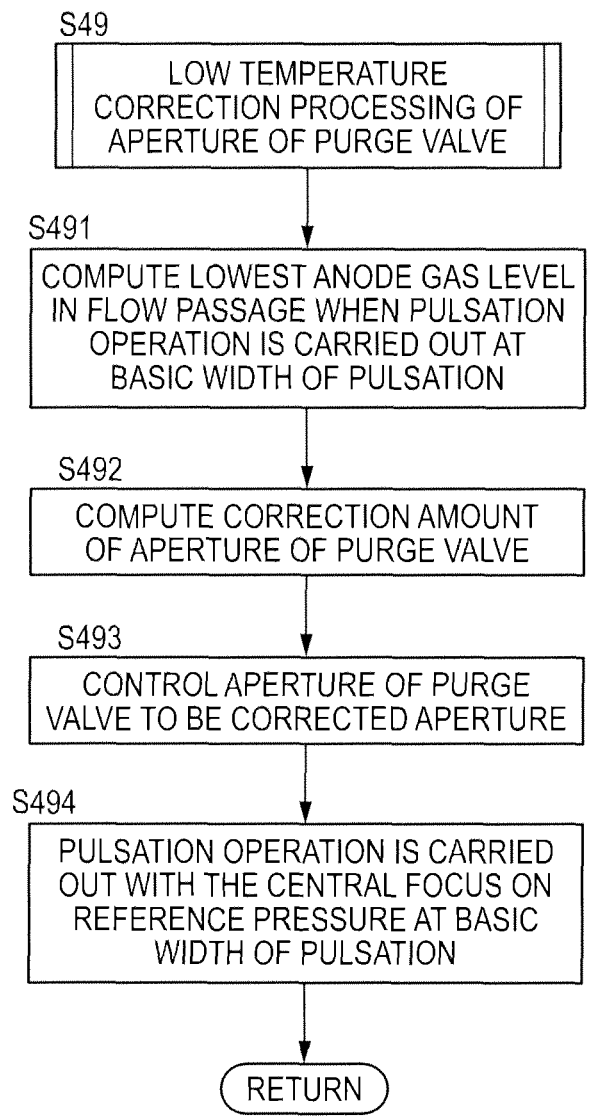
FIG. 30 is a flowchart explaining the low temperature correction processing of the aperture of the purge valve according to the fourth embodiment of the present invention.

FIG. 30 is a flowchart explaining the low temperature correction processing of the aperture of the purge valve.

The controller 4 computes the lowest anode gas level in the flow passage during the pulsation operation at the basic width of the pulsation with reference to the above-described map of FIG. 12 in Step S491.

Figure 31:
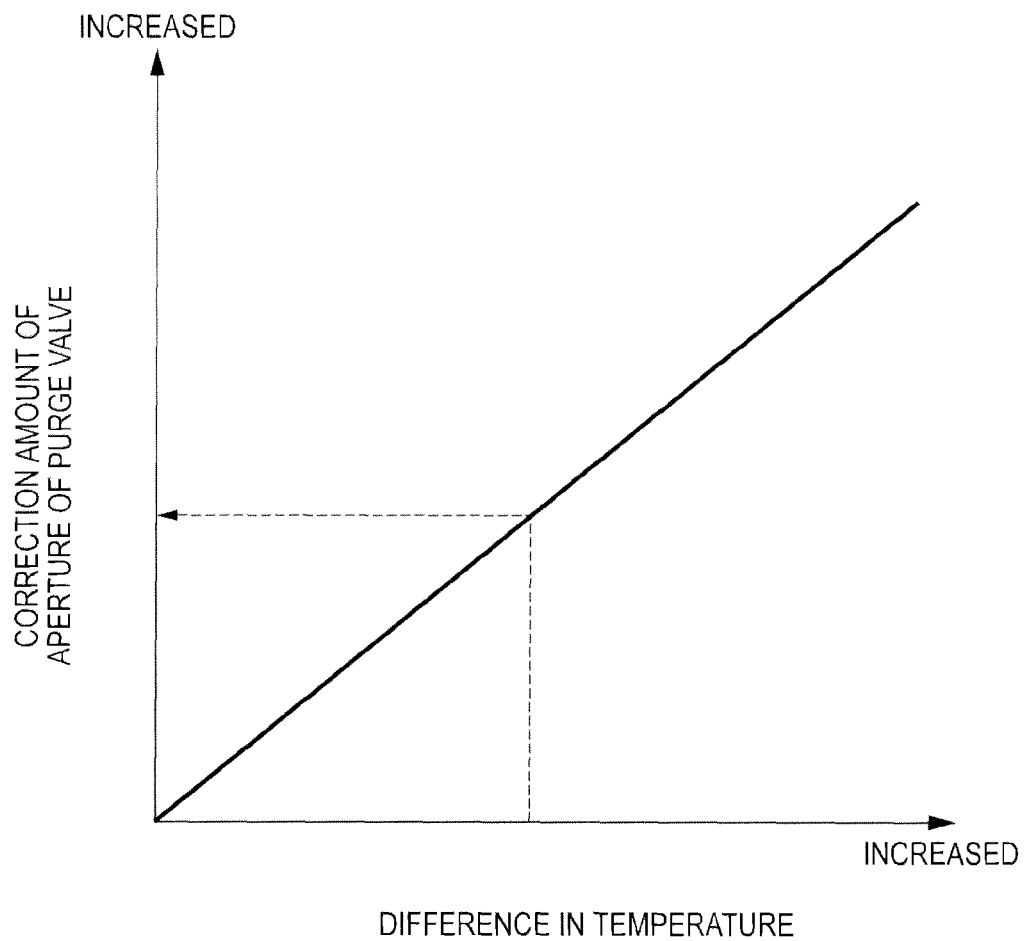
FIG. 31 is a table for computing the correction amount of the aperture of the purge valve from the difference in level.

The controller 4 computes the correction amount of the aperture of the purge valve 38 on the basis of the difference in level obtained by subtracting the allowable lower limit anode gas level from the computed lowest anode gas level in the flow passage with reference to the table illustrated in FIG. 31 in Step S492. As illustrated in FIG. 31, the correction amount of the aperture of the purge valve 38 is computed such that the larger the level difference becomes, the larger the aperture of the purge valve 38 becomes compared to the basic aperture.

The controller 4 makes the aperture of the purge valve 38 to be the corrected aperture in which the correction amount of the aperture is added to the basic aperture of the purge valve 38 in Step S493.

The controller 4 carries out the pulsation operation at the basic width of the pulsation with the central focus on the reference pressure in Step S494.

Figure 32:
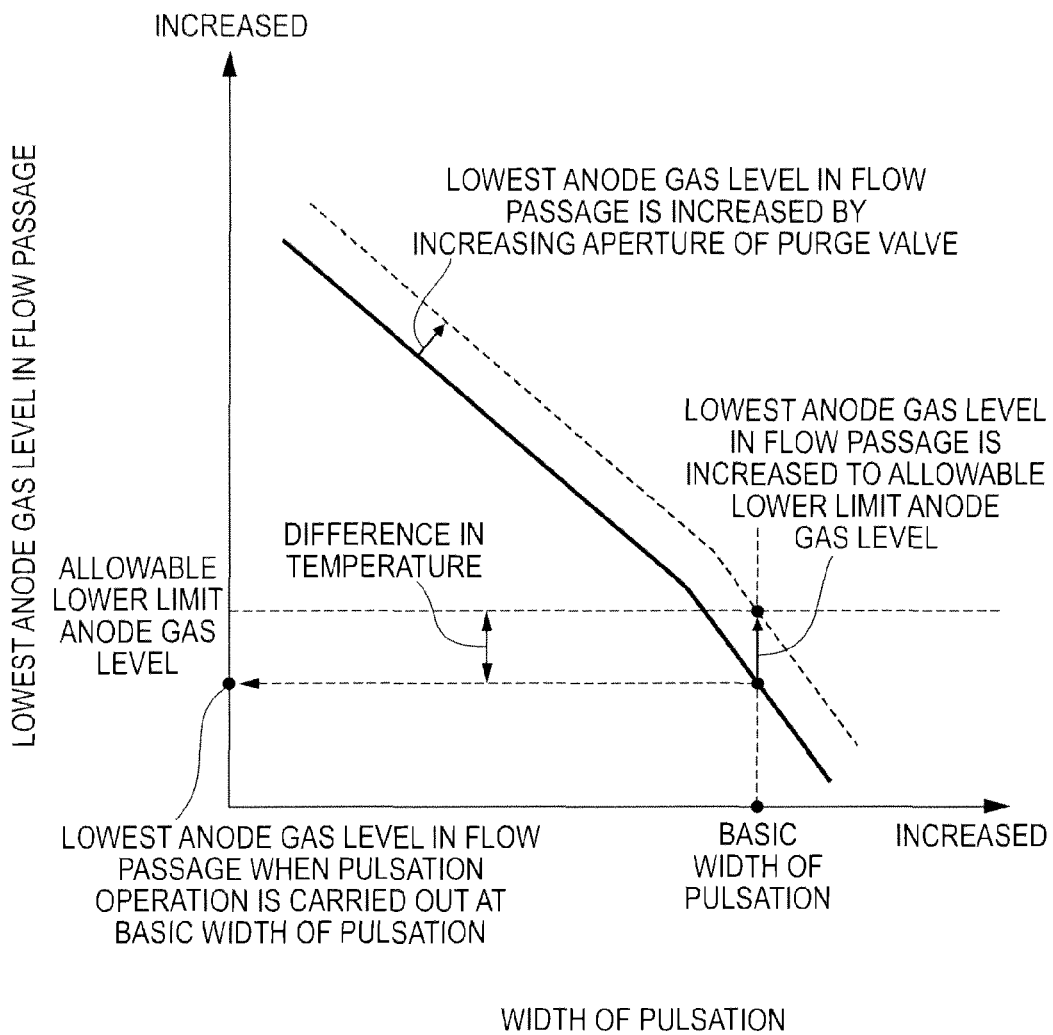
FIG. 32 is a view explaining the action of the low temperature correction processing of the aperture of the purge valve according to the fourth embodiment of the present invention.

FIG. 32 is a view explaining the action of the low temperature correction processing of the aperture of the purge valve according to the present embodiment, namely, a view explaining a relation between the width of the pulsation and the lowest anode gas level in the flow passage when the temperature of the buffer tank 36 is a specific temperature lower than the steady temperature of the fuel cell stack 2.

As illustrated in FIG. 32, if the pulsation operation is carried out at the basic width of the pulsation when the temperature of the buffer tank 36 is lower than the steady temperature of the fuel cell stack 2, the lowest anode gas level in the flow passage becomes lower than the allowable lower limit anode gas level.

Therefore, according to the present embodiment, the aperture of the purge valve 38 is made larger than the basic aperture in order to increase the lowest anode gas level in the flow passage to the allowable lower limit anode gas level. Thus, it is also possible to obtain the same advantage as the first embodiment by only correcting the aperture of the purge valve 38 without correction of the width of the pulsation.

The embodiments of the present invention have been described above; however, the above-described embodiments merely indicate some examples of the application of the present invention with no intention to limit the technical scope of the present invention to the specific configurations of the above-described embodiments.

According to the above-described respective embodiments, the temperature of the buffer tank 36 is computed by the operation; however, the present invention is not limited to this. For example, the temperature of the buffer tank 36 may be directly detected by providing a temperature sensor to the buffer tank 36.

In addition, according to the above-described respective embodiments, the width of the pulsation is corrected on the basis of the temperature of the buffer tank 36; however, the present invention is not limited to this. For example, using the volume of the anode gas supply passage 32 from the pressure-adjusting valve 33 to the fuel cell stack 2 (hereinafter, referred to as "an upstream buffer volume") to resemble the buffer tank, the width of the pulsation may be corrected on the basis of the temperature of this upper buffer volume as is the case with the above-described respective embodiments. In addition, the width of the pulsation may be corrected in accordance with the difference in temperature between the fuel cell stack 2 and the buffer tank 36.

Further, according to the first embodiment, the pulsation operation may be carried out at the allowable maximum width of the pulsation in order to prevent the lowest anode gas level in the flow passage from falling below the allowable lower limit anode gas level by correcting the width of the pulsation to be smaller than the basic width of the pulsation when the temperature of the buffer tank 36 is lower than that of the fuel cell stack 2; however, the present invention is not limited to this. For example, the pulsation operation may be carried out while decreasing the width of the pulsation less than the allowable maximum width of the pulsation since the smaller the width of the pulsation is, the higher the anode gas level in the flow passage becomes.

In this case, it is possible to decrease the width of the pulsation less than the allowable maximum width of the pulsation within the range that the kinetic energy of the anode gas does not fall below the allowable lower limit kinetic energy, namely, the range that the width of the pulsation does not fall below the allowable minimum width of the pulsation since the smaller the width of the pulsation is made, the lower the kinetic energy of the anode gas becomes. Thereby, it is possible to ensure the discharge performance of liquid water while ensuring the electric power generation performance.

The present application claims the priority based on Japanese Patent Application No. 2011-124220 filed with Japan Patent Office on Jun. 2, 2011 and all contents of this application are incorporated in the present specification by reference.

The invention claimed is:

1. A fuel cell system that generates electric power by supplying anode gas and cathode gas to a fuel cell, comprising:
a control valve adapted to control a pressure of the anode gas to be supplied to the fuel cell;
a buffer unit adapted to store an anode-off gas to be discharged from the fuel cell; and
a controller programmed to:
control the control valve in order to periodically increase and decrease the pressure of the anode gas at a specific width of a pulsation,
correct the width of the pulsation based on a temperature of the buffer unit, and
decrease the width of the pulsation when the temperature of the buffer unit is lower than a steady temperature of the fuel cell.

2. The fuel cell system according to claim 1,
wherein the controller is programmed to set a lower limit of the width of the pulsation in a case of decreasing the width of the pulsation in order to prevent kinetic energy of the anode gas flowing through the anode gas flow passage in the fuel cell from falling below an allowable lower limit kinetic energy which can discharge liquid water located in the anode gas flow passage to the buffer unit.

3. The fuel cell system according to claim 1, comprising:
a purge valve adapted to adjust a flow rate of the anode-off gas to be discharged from the buffer unit;
wherein the controller is further programmed to:
control an aperture of the purge valve in accordance with an operation status of the fuel cell system in order to make the anode gas level in the buffer unit be a specific level;
determine a moisture status of the fuel cell; and
make the anode gas level in the buffer unit higher than the specific level by increasing the aperture of the purge valve and decrease a reduced width upon decreasing the width of the pulsation based on the moisture status of the fuel cell.

4. The fuel cell system according to claim 1,
wherein the higher a load of the fuel cell is, the more the controller increases the width of the pulsation.

5. The fuel cell system according to claim 1,
wherein the controller is programmed to increase the width of the pulsation in order to prevent kinetic energy of the anode gas flowing through an anode gas flow passage in the fuel cell from falling below an allowable lower limit kinetic energy which can discharge liquid water located in the anode gas flow passage to the buffer unit when the temperature of the buffer unit is higher than a steady temperature of the fuel cell.

6. The fuel cell system according to claim 5, comprising:
a purge valve adapted to adjust a flow rate of the anode-off gas to be discharged from the buffer unit;
wherein the controller is further programmed to:
control an aperture of the purge valve in accordance with an operation status of the fuel cell system in order to make the anode gas level in the buffer unit be a specific level;
compute a lowest level of the anode gas flow passage in the fuel cell during a pulsation operation at the width of the pulsation that is corrected by the controller such that it becomes large; and
correct the aperture of the purge valve in accordance with the computed lowest level.

7. The fuel cell system according to claim 6,
wherein the controller is programmed to make, when the computed lowest level is higher than a specific allowable lower limit level, the anode gas level in the buffer unit lower than the specific level by decreasing the aperture of the purge valve in order to decrease the lowest level of the anode gas flow passage in the fuel cell during the pulsation operation at the corrected width of the pulsation to the allowable lower limit level.

8. The fuel cell system according to claim 6,
wherein the controller is programmed to make, when the computed lowest level is lower than a specific allowable lower limit level, the anode gas level in the buffer unit higher than the specific level by increasing the aperture of the purge valve in order to increase the lowest level of the anode gas flow passage in the fuel cell during the pulsation operation at the corrected width of the pulsation to the allowable lower limit level.

9. A fuel cell system that generates electric power by supplying anode gas and cathode gas to a fuel cell, comprising:
a control valve adapted to control a pressure of the anode gas to be supplied to the fuel cell;
a buffer unit adapted to store an anode-off gas to be discharged from the fuel cell;
a purge valve adapted to adjust a flow rate of the anode-off gas to be discharged from the buffer unit; and
a controller programmed to:
control the control valve in order to periodically increase and decrease the pressure of the anode gas at a specific width of a pulsation;
correct the width of the pulsation based on a temperature of the buffer unit;
control an aperture of the purge valve in accordance with an operation status of the fuel cell system in order to make the anode gas level in the buffer unit be a specific level; and
make the anode gas level in the buffer unit higher than the specific level by increasing the aperture of the purge valve when the temperature of the buffer unit is lower than a steady temperature of the fuel cell.

10. The fuel cell system according to claim 9,
wherein the controller is programmed to increase the aperture of the purge valve in order to prevent the anode gas level in an anode gas flow passage in the fuel cell from falling below a specific allowable lower limit level.

11. A method of generating electric power in a fuel cell, the method comprising:
supplying anode gas to the fuel cell;
supplying cathode gas to the fuel cell;
controlling a pressure of the anode gas supplied to the fuel cell;
storing, in a buffer unit, an anode-off gas discharged from the fuel cell;

controlling a control valve to periodically increase and decrease the pressure of the anode gas at a specific width of a pulsation;
correcting the width of the pulsation based on a temperature of the buffer unit, and
decreasing the width of the pulsation when the temperature of the buffer unit is lower than a steady temperature of the fuel cell.

\* \* \* \* \*